(12) United States Patent
Inoue et al.

(10) Patent No.: US 7,108,631 B2
(45) Date of Patent: Sep. 19, 2006

(54) CONTINUOUSLY VARIABLE TRANSMISSION

(75) Inventors: Eiji Inoue, Kanagawa (JP); Takashi Imanishi, Kanagawa (JP)

(73) Assignee: NSK Ltd., Tokyo (JP)

( * ) Notice: Subject to any disclaimer, the term of this patent is extended or adjusted under 35 U.S.C. 154(b) by 167 days.

(21) Appl. No.: 10/820,000

(22) Filed: Apr. 8, 2004

(65) Prior Publication Data

US 2004/0204284 A1 Oct. 14, 2004

(30) Foreign Application Priority Data

Apr. 10, 2003 (JP) .......................... P2003-105967

(51) Int. Cl.
*B60W 10/10* (2006.01)
(52) U.S. Cl. .......................... 477/37; 477/41
(58) Field of Classification Search ............ 477/37, 477/41
See application file for complete search history.

(56) References Cited

U.S. PATENT DOCUMENTS

| | | | |
|---|---|---|---|
| 6,251,039 B1 | 6/2001 | Koga | |
| 6,273,839 B1 | 8/2001 | Dutson | |
| 6,312,357 B1 * | 11/2001 | Sakai et al. | 477/37 |
| 6,317,672 B1 | 11/2001 | Kuramoto et al. | |
| 6,612,965 B1 * | 9/2003 | Yasuoka et al. | 477/37 |
| 6,830,533 B1 * | 12/2004 | Inoue et al. | 477/37 |

FOREIGN PATENT DOCUMENTS

| | | | | |
|---|---|---|---|---|
| GB | 2 227 287 A | | 7/1990 | |
| JP | 4-502954 A | | 5/1992 | |
| JP | 06-42618 | * | 2/1994 | .................. 477/37 |
| JP | 6-101754 A | | 4/1994 | |
| JP | 9-89096 A | | 3/1997 | |
| JP | 10-103461 A | | 4/1998 | |
| JP | 10-246326 A | | 9/1998 | |
| JP | 10-246327 A | | 9/1998 | |
| JP | 11-247983 A | | 9/1999 | |
| JP | 11-247984 A | | 9/1999 | |
| JP | 2000-220719 A | | 8/2000 | |
| JP | 2001-82595 A | | 3/2001 | |
| JP | 2001-235014 A | | 8/2001 | |
| JP | 2002-512350 A | | 4/2002 | |

* cited by examiner

*Primary Examiner*—Ha Ho
(74) *Attorney, Agent, or Firm*—Sughrue Mion, PLLC

(57) ABSTRACT

A rotational speed of an input side disk is detected by an input side rotation sensor, and a rotational speed of an output side disk is detected by an output side rotation sensor, respectively. Based on detected values of the two sensors, a transmission ratio of a toroidal type continuously variable transmission is calculated. Further, a rotational speed of the output shaft is calculated from the transmission ratio and a gear ratio of a planetary gear type transmission. In a state in which the select lever selects no-running condition, the transmission ratio of the toroidal type continuously variable transmission is controlled such that the rotational speed of the output shaft becomes null or at an extremely low speed even when the running state is selected at the instance. Further, a position of a control valve apparatus under the state is stored to a controller.

12 Claims, 12 Drawing Sheets

CONTINUOUSLY VARIABLE TRANSMISSION

BACKGROUND OF THE INVENTION

The present invention relates to a continuously variable transmission apparatus utilized as an automatic transmission apparatus for a vehicle integrated with a toroidal type continuously variable transmission, for improving a characteristic when the vehicle is stationary or at an extremely low speed.

A toroidal type continuously variable transmission, as shown in FIGS. 6 to 8, has been researched to use as an automatic transmission apparatus for a vehicle, and is partially embodied. The toroidal type continuously variable transmission is referred to as a double cavity type, and input side disks 2, 2 are supported by surroundings of both end portions of an input shaft 1 via ball splines 3, 3. Therefore, the two input side disks 2, 2 are supported concentrically and synchronizingly rotatably. Further, an output gear 4 is supported at a surrounding of a middle portion of the input shaft 1 rotatably relative to the input shaft 1. Further, output side disks 5, 5 are engaged to both end portions of a cylindrical portion provided at a central portion of the output gear 4 respectively by splines. Therefore, the two output side disks 5, 5 are synchronizingly rotated along with the output gear 4.

Further, respective pluralities (normally, two through three pieces respectively) of power rollers 6, 6 are interposed between the respective input side disks 2, 2 and the respective output side disks 5, 5. The respective power rollers 6, 6 are respectively rotatably supported by inner side faces of trunnions 7, 7 via support shafts 8, 8 and a plurality of rolling bearings. The respective trunnions 7, 7 are swingable centering on pivot shafts 9, 9 provided at the respective trunnions 7, 7 concentrically with each other at both end portions in respective length directions (up and down direction of FIGS. 6, 8 and head and tail direction of FIG. 7). A motion of inclining the respective trunnions 7, 7 is carried out by displacing the respective trunnions 7, 7 in axial directions of the pivot shafts 9, 9 by hydraulic type actuators 10, 10 and inclined angles of all of the trunnions 7, 7 are synchronized with each other hydraulically and mechanically.

That is, when the inclined angles of the respective trunnions 7, 7 are changed in order to change a transmission ratio between the input shaft 1 and the output gear 4, the respective trunnions 7, 7 are displaced by the respective actuators 10, 10 respectively in reverse directions, for example, the power roller 6 on a right side of FIG. 8 is displaced to a lower side of the drawing and the power roller 6 on a left side of the drawing is displaced to an upper side of the drawing respectively by the same distance. As a result, directions of forces in tangential lines operated to contact portions between peripheral faces of the respective power rollers 6, 6 and inner side faces of the respective input and output side disks 2, 2 and the respective output side disks 5, 5 are changed (side slip is produced at the contact portion). Further, in accordance with the change in the directions of the forces, the respective trunnions 7, 7 are swung (inclined) in directions reverse to each other centering on the pivot shafts 9, 9 axially supported by support plates 11, 11. As a result, contact positions between the peripheral faces of the respective power rollers 6, 6 and the inner side faces of the respective input side and output side disks 2, 5 are changed and a rotational transmission ratio between the input shaft 1 and the output gear 4 is changed.

A state of charging and discharging a pressurized oil to and from the respective actuators 10, 10 is controlled by a single piece of control valve 12 regardless of a number of the respective actuators 10, 10 and movement of any single piece of trunnion 7 is fed back to the control valve 12. The control valve 12 includes a sleeve 14 displaced by a stepping motor 13 in an axial direction (left and right direction of FIG. 8, head and tail direction of FIG. 6) and a spool 15 fit to an inner diameter side of the sleeve 14 displaceably in the axial direction. Further, in rods 17, 17, connecting the respective trunnions 7, 7 and pistons 16, 16 of the actuators 10, 10, an end portion of the rod 17 belonging to any single piece of the trunnion 7 is fixed with a precess cam 18 and there is constituted a feedback mechanism for transmitting movement of the rod 17, that is, a synthesized value of a displacement amount in an axial direction and a displacement amount in a rotational direction to the spool 15 via the precess cam 18 and a link arm 19. Further, a synchronizing cable 20 is hung between the respective trunnions 7, 7 to thereby mechanically synchronize the inclined angles of the respective trunnions 7, 7 even in a failure in a hydraulic system.

In switching a speed changing state, a flow path in a predetermined direction of the control valve 12 is opened by displacing the sleeve 14 to a predetermined position compatible with a desired transmission ratio by the stepping motor 13. As a result, a pressurized oil is fed in the predetermined direction to the respective actuators 10, 10 and the respective actuators 10, 10 displace the trunnions 7, 7 in the predetermined direction. That is, in accordance with feeding the pressurized oil, the respective trunnions 7, 7 are swung centering on the respective pivot shafts 9, 9 while being displaced in axial directions of the respective pivot shafts 9, 9. Further, movement (in axial direction and swinging displacement) of any single piece of the trunnion 7 is transmitted the spool 15 via the precess cam 18 fixed to the end portion of the rod 17 and the link arm 19 to displace the spool 15 in the axial direction. As a result, in a state of displacing the trunnion 7 by a predetermined amount, the flow path of the control valve 12 is closed and the pressurized oil is stopped from charging and discharging to and from the respective actuators 10, 10.

The movement of the control valve 12 based on displacements of the trunnion 7 and came face 21 of the precess cam 18 at this occasion is as follows. First, when the trunnion 7 is displaced in the axial direction in accordance with opening the flow path of the control valve 12, as described above, by the side slip produced at the contact portions between the peripheral face of the power roller 6 and the inner side faces of the input side disk 2 and the output side disk 5, the trunnion 7 starts to be displaced to swing centering on the respective pivot shafts 9, 9. Further, in accordance with the displacement in the axial direction of the trunnion 7, the displacement of the cam face 21 is transmitted to the spool 15 via the link arm 19 and the spool 15 is displaced in the axial direction to change a state of switching the control valve 12. Specifically, the control valve 12 is switched in a direction of returning the trunnion 7 to a neutral position by the actuator 10.

Therefore, the trunnion 7 starts displacing in a reverse direction toward the neutral position immediately after being changed in the axial direction. However, so far as the displacement of the neutral portion is present, the trunnion 7 continues swinging centering on the respective pivot shafts 9, 9. As a result, a displacement of the precess cam 18 with regard to a circumferential direction of the cam face 21 is transmitted to the spool 15 via the link arm 19 and the spool 15 is displaced in the axial direction. Further, simultaneously with returning the trunnion 7 to the neutral position in a state in which the inclined angle of the trunnion 7 reaches a predetermined angle matching the desired transmission ratio, the control valve 12 is closed and the pressurized oil is stopped to charge and discharge to and from the actuator 10. As a result, the inclined angle of the trunnion 7 becomes an angle compatible with an amount of displacing the sleeve 14 in the axial direction by the stepping motor 13.

In operating the above-described toroidal type continuously variable transmission, the input side disk 2 on one side (left side of FIGS. 6, 7) is driven to rotate by a drive shaft 22 connected to a power source of an engine or the like via a press apparatus 23 of a loading cam type, as illustrated. As a result, the pair of input side disks 2, 2 supported by the both end portions of the input shaft 1 are rotated synchronizingly while being pressed in directions proximate to each other. Further, the rotation is transmitted to the respective output side disks 5, 5 via the respective power rollers 6, 6 and outputted from the output gear 4.

When power is transmitted from the respective input side disks 2, 2 to the respective output side disks 5, 5 in this way, in accordance with friction at rolling contact portions (traction portions) between the peripheral faces of the respective power rollers 6, 6 supported at the respective inner side faces and the inner side faces of the respective disks 2, 5, the respective trunnions 7, 7 are exerted with forces in axial directions of the pivot shafts 9, 9 provided at the respective both end portions. The force is referred to as so-to-speak 2 Ft and a magnitude thereof is proportional to a torque transmitted from the respective input side of the disks 2, 2 to the respective output side disks 5, 5 (or from output side disks 5, 5 to input side disks 2, 2). Further, such a force 2 Ft is supported by the respective actuators 10, 10. Therefore, in operating the toroidal type continuously variable transmission, a pressure difference between pairs of hydraulic chambers 24a, 24b present on both sides of the pistons 16, 16 constituting the respective actuators 10, 10 is proportional to the magnitude of the force 2 Ft.

In the case in which rotational speeds of the input shaft 1 and the output gear 4 are changed, first, when the speed is reduced between the input shaft 1 and the output gear 4, the respective trunnions 7, 7 are moved in the axial directions of the respective pivot shafts 9, 9 by the respective actuators 10, 10 to swing to positions shown in FIG. 7. Further, as shown by FIG. 7, the peripheral faces of the respective power rollers 6, 6 are made to be respectively brought into contact with portions of the respective input side disks 2, 2 on sides of centers of the inner side faces and portions of the respective outputs side disks 5, 5 on sides of outer peripheries of the inner side faces. On the contrary, in increasing the speed, the respective trunnions 7, 7 are swung in directions opposed to those of FIG. 7 and contrary to a state shown in FIG. 7, the respective trunnions 7, 7 are inclined such that the peripheral faces of the respective power rollers 6, 6 are respectively brought into contact with portions of the respective input side disks 2, 2 on sides of the outer peripheries and portions of the respective output side disks 5, 5 on sides of the centers of the inner side faces. A middle transmission ratio (speed ratio) is provided between the input shaft 1 and the output gear 4 when the inclined angles of the respective trunnions 7, 7 are set to middles.

Further, when the toroidal type continuously variable transmission constituted and operated as described above is integrated to an actual continuously variable transmission for an automobile, it has conventionally been proposed to constitute a continuously variable transmission apparatus by combining the toroidal type continuously variable transmission to a gear type differential unit of a planetary gear mechanism or the like. For example, U.S. Pat. No. 6,251,039 discloses a continuously variable transmission apparatus which is referred to so-to-speak geared neutral and can switch a rotational state of an output shaft to regular rotation and reverse rotation by interposing a stationary state while rotating an input shaft in one direction. FIG. 9 shows such a continuously variable transmission apparatus described in U.S. Pat. No. 6,251,039. The continuously variable transmission apparatus is constituted by combining a toroidal type continuously variable transmission 25 and a planetary gear type transmission 26. The toroidal type continuously variable transmission 25 in the apparatus is provided with an input shaft 1, a pair of input side disks 2, 2, an output side disk 5a, and a plurality of power rollers 6, 6. In the illustrated example, the output side disk 5a is constituted by a structure of butting outer side faces of a pair of the output side disks to integrate.

The planetary gear type transmission 26 is provided with a carrier 27 coupled to fix to the input shaft 1 and the input side disk 2 on one side (right side of FIG. 9). A first transmitting shaft 29 both end portions of which are respectively provided fixedly with planetary gear elements 28a, 28b is rotatably supported by a middle portion in a diameter direction of the carrier 27. Further, a second transmitting shaft 31 both end portions of which are fixedly provided with sun gears 30a, 30b is supported rotatably on a side opposed to the input shaft 1 by interposing the carrier 27 there between concentrically with the input shaft 1. Further, each of the planetary gear elements 28a, 28b and a sun gear 33 fixedly provided to a front end portion (right end portion of FIG. 9) of a hollow rotating shaft 32 a base end portion (left end portion of FIG. 9) is coupled with the output side disk 5a or the sun gear 30a fixedly provided to one end portion (left end portion of FIG. 9) of the second transmitting shaft 31 are respectively brought in mesh with each other. Further, the planetary gear element 28a on one side (left side of FIG. 9) is brought in mesh with a ring gear 35 rotatably provided at a surrounding of the carrier 27 via other planetary gear element 34.

Meanwhile, planetary gear elements 37a, 37b are rotatably supported by a second carrier 36 provided at a surrounding of the sun gear 30b fixedly provided to other end portion (right end portion of FIG. 9) of the second transmitting shaft 31. Further, the second carrier 36 is fixedly provided to a base end portion (left end portion in FIG. 9) of an output shaft 38 arranged concentrically with the input shaft 1 and the second transmitting shaft 31. Further, the respective planetary gear elements 37a, 37b are brought in mesh with each other, the planetary gear element 37a on one side is brought in mesh with the sun gear 30b, and the planetary gear element 37b on other side is brought in mesh with a second ring gear 39 provided rotatably at a surrounding of the second carrier 36, respectively. Further, the ring gear 35 and the second carrier 36 are made to be engageable and disengageable by a low speed clutch 40, and the second ring gear 39 and a fixed portion of a housing or the like are made to be engageable and disengageable by a high speed clutch 41.

In the case of the above-described continuously variable transmission apparatus shown in FIG. 9, in a so-to-speak low speed mode state connecting the low speed clutch 40 and disconnecting the high speed clutch 41, power of the input shaft 1 is transmitted to the output shaft 38 via the ring gear 35. Further, by changing a transmission ratio of the toroidal type continuously variable transmission 25, a transmission ratio as a total of the continuously variable transmission apparatus, that is, a transmission ratio between the input shaft 1 and the output shaft 38 is changed. In such a low speed mode state, the gear ratio of the total of the continuously variable apparatus is changed infinitively. That is, by adjusting the transmission ratio of the toroidal type continuously variable transmission 25, while bringing the input shaft 1 in a state of being rotated in one direction, a rotational state of the output shaft 38 can be converted to regular rotation and reverse rotation by interposing a stationary state.

Further, in running at an accelerated speed or a constant speed in such a low speed mode state, a torque (passing torque) passing the toroidal type continuously variable transmission 25 is applied from the input shaft 1 to the output shaft disk 5a via the carrier 27, the first transmitting shaft 29, the sun gear 33 and the hollow rotating shaft 32 and is applied from the output side disk 5a to the respective input side disks 2, 2 via the respective power rollers 6, 6. That is, the torque passing the toroidal type continuously variable transmission 25 in running at the accelerated speed or the constant speed is circulated in a direction in which the respective input side disks 2, 2 receive the torque from the respective power rollers 6, 6.

In contrast thereto, in a so-to-speak high speed mode state in which the low speed clutch 40 is disconnected and the high speed clutch 41 is connected, the power of the input shaft 1 is transmitted to the output shaft 38 via the first and the second transmitting shafts 29, 31. Further, by changing the transmission ratio of the toroidal type continuously variable transmission 25, the transmission ratio as the total of the continuously variable transmission apparatus is changed. In this case, the larger the transmission ratio of the toroidal type continuously variable transmission 25, the larger the transmission ratio of the total of the continuously variable transmission apparatus.

Further, in running at an accelerated state or a constant speed in such a high speed mode state, a torque passing the toroidal type continuously variable transmission 25 is applied in a direction in which the respective input side disks 2, 2 apply the torque to the respective power rollers 6, 6.

In the case of the continuously variable transmission apparatus having a structure as shown by, for example, FIG. 9 and capable of realizing a so-to-speak infinity transmission ratio for stopping the output shaft 3 while the input shaft 1 is brought into a state of being rotated, it is important to maintain the torque applied to the toroidal type continuously variable transmission 25 to a proper value in a state of extremely increasing the transmission ratio including the state of stopping the output shaft 38 in view of ensuring durability of the toroidal continuously variable transmission 25 and ensuring easiness in driving operation. Because as is apparent from a relationship of "rotational drive force=rotational speed×torque", in the state in which the transmission ratio is extremely large and the output shaft 38 is stationary or rotated at an extremely low speed while rotating the input shaft 1, the torque (passing torque) passing the toroidal type continuously variable transmission 25 becomes larger than a torque applied to the input shaft 1. Therefore, in order to ensure the durability of the toroidal type continuously variable transmission 25 without making the toroidal type continuously variable transmission 25 large-sized, it is necessary to carry out a strict control in order to confine the torque within a proper value as described above. Specifically, in order to stop the output shaft 38 while making the torque inputted to the input shaft 1 as small as possible, a control including a drive source is needed.

Further, in the state in which the transmission ratio is extremely large, even when the transmission ratio of the toroidal type continuously variable transmission 25 is slightly changed, the torque applied to the output shaft 38 is changed by a large amount. Therefore, when the transmission ratio control of the toroidal type continuously variable transmission 25 is not carried out strictly, there is a possibility that a strange feeling is given to a driver or the driver is difficult to carry out driving operation. For example, the case of an automatic transmission for an automobile, in stopping the automobile, the stationary state is maintained while the driver depressing a brake. In such a case, when the transmission ratio control of the toroidal type continuously variable transmission 25 is not carried out strictly and a large torque is applied to the output shaft 38, a force required for depressing the brake pedal in stopping the automobile is increased and fatigue of the driver is increased. Conversely, when the transmission ratio control of the toroidal type continuously variable transmission 25 is not carried out strictly in starting and the torque applied to the output shaft 38 becomes excessively small, there is a possibility that smooth starting is not carried out or a vehicle is moved rearward in starting on an uphill. Therefore, in stopping or in running at an extremely low speed, other than controlling the torque transmitted from the drive source to the input shaft 1, the transmission ratio control of the toroidal type continuously variable transmission 25 needs to carry out strictly.

In consideration of such a point, JP-A-10-103461 discloses a structure of restricting the torque (passing torque) passing the toroidal type continuously variable transmission by directly controlling the pressure difference of the hydraulic type actuator portion for displacing the trunnion.

However, in the case of the structure as disclosed in JP-A-10-103461, the control is carried out only by the pressure difference and therefore, it is difficult to stop an attitude of the trunnion at an instance at which the passing torque coincides with the target value. Specifically, since an amount of displacing the trunnion for controlling the torque is increased, so-to-speak overshooting (and hunting accompanied thereby) at which the trunnion is not stopped but continuous displacing as it is liable to be produced at the instance at which the passing torque coincides with the target value and the control of the passing torque is not stabilized.

Particularly, in the case of the toroidal type continuously variable transmission 25 which is not provided with so-to-speak cast angle in which directions of the respective pivot shafts 9, 9 provided at the both end portions of the trunnion 7, 7 and directions of center axes of the input side and the output side respective disks 2, 5 are directions orthogonal to each other as in a general half toroidal type continuously variable transmission shown in FIGS. 6 through 8, the overshooting is liable to be produced. In contrast thereto, in the case of a structure having the cast angle as in a general full toroidal type continuously variable transmission, a force in a direction of converging the overshooting is operated and therefore, it seems that sufficient torque control can be carried out even in the structure as disclosed in JP-A-10-103461.

In view of such a situation, FIG. 10 shows an example of a structure of a continuously variable transmission apparatus capable of strictly carrying out the control of the torque (passing torque) passing the toroidal type continuously variable transmission, even in a continuously variable transmission apparatus integrated with a toroidal continuously variable transmission which is not provided with the cast angle as in the general half toroidal type continuously variable transmission. Although the continuously variable transmission apparatus shown in FIG. 10 is provided with a function similar to that of the continuously variable transmission apparatus which is shown in FIG. 9 and has been known conventionally, by devising a structure of a portion of a planetary gear type transmission 26a, integrating performance of the portion of the planetary gear type transmission 26a is improved.

A first and a second planetary gear 42, 43 respectives of which are of a double pinion type are supported by both side faces of a carrier 27a rotated along with an input shaft 1 and the pair of input side disks 2, 2. That is, the first and the second planetary gears 42, 43 are constituted by respective pairs of planetary gear elements 44a, 44b, 45a, 45b. Further, the respective planetary gear elements 44a, 44b, 45a, 45b are brought in mesh with each other. The planetary gear elements 44a, 45a on an inner diameter side are respectively brought in mesh with a first and a second sun gear 47, 48 provided fixedly to a front end portion (right end portion of FIG. 10) of a hollow rotating shaft 32a with a base end portion (left end portion of FIG. 10) coupled to the output side disk 5a and one end portion (left end portion of FIG. 10) of a transmitting shaft 46. Further, the planetary gear elements 44b, 45b on an outer diameter side are brought in mesh with a ring gear 49, respectively.

Meanwhile, planetary gear elements 51a, 51b are rotatably supported by a second carrier 36a provided at a surrounding of a third sun gear 50 fixedly provided to other end portion (right end portion of FIG. 10) of the transmitting shaft 46. Further, the second carrier 36a is fixedly provided to a base end portion (left end portion of FIG. 10) of an output shaft 38a arranged concentrically with the input shaft 1. Further, the respective planetary gear elements 51a, 51b are brought in mesh with each other. The planetary gear element 51a on an inner diameter side is brought in mesh with the third sun gear 50. The planetary gear element 51b on an outer diameter side is brought in mesh with a second ring gear 39a rotatably provided at a surrounding of the second carrier 36a. Further, the ring gear 49 and the second carrier 36a are made to be engageable and disengageable by a low speed clutch 40a and the second ring gear 39a and a fixed portion of a housing or the like are made to be engageable and disengageable by a high speed clutch 41a.

In the case of the improved continuously variable transmission apparatus constituted in this way, in a state of connecting the low speed clutch 40a and disconnecting the high speed clutch 41a, power of the input shaft 1 is transmitted to the output shaft 38a via the ring gear 49. Further, by changing a transmission ratio of the toroidal type continuously variable transmission 25, a speed ratio $e_{CVT}$ as a total of the continuously variable transmission apparatus, that is, a speed ratio between the input shaft 1 and the output shaft 38a is changed. A relationship between a speed ratio $e_{CVU}$ of the toroidal type continuously variable transmission 25 and the speed ratio $e_{CVT}$ of the total of the continuously variable transmission apparatus is represented by Equation (1) as follows when a ratio of a teeth number $m_{49}$ of the ring gear 49 and a teeth number $m_{47}$ of the first sun gear 47 is designated by notation $i_1$ (=$m_{49}/m_{47}$).

$$e_{CVT} = (e_{CVU} \cdot i_1 - 1)/i_1 \tag{1}$$

Further, when the ratio $i_1$ of the teeth numbers is, for example, 2, the relationship between the speed ratios $e_{CVU}$ and $e_{CVT}$ is changed as shown by a line segment α of FIG. 11.

In contrast thereto, in a state in which the low speed clutch 40a is disconnected and the high speed clutch 41a is connected, power of the input shaft 1 is transmitted to the output shaft 38a via the first planetary gear 42, the ring gear 49, the second planetary gear 43, the transmitting shaft 46, the respective planetary gear elements 51a, 51b and the second carrier 36a. Further, by changing the speed ratio $e_{CVU}$ of the toroidal type continuously variable transmission 25, the speed ratio $e_{CVT}$ of the total of the continuously variable transmission apparatus is changed. A relationship between the speed ratio $e_{CVU}$ of the toroidal type continuously variable transmission 25 and the speed ratio $e_{CVT}$ of the total of the continuously variable transmission apparatus at this occasion is as shown by Equation (2), shown below. Further, in Equation (2), notation $i_1$ designates the ratio ($m_{49}/m_{47}$) of the teeth number $m_{49}$ of the ring gear 49 to the teeth number $m_{47}$ of the first sun gear 47, notation $i_2$ designates a ratio ($m_{49}/m_{48}$) of the teeth number $m_{49}$ of the ring gear 49 to a teeth number $m_{48}$ of the second sun gear 48 and notation $i_3$ designates a ratio ($m_{39}/m_{50}$) of a teeth number $m_{39}$ of the second ring gear 39a to a teeth number $m_{50}$ of the third sun gear 50, respectively.

$$e_{CVT} = \{1/(1-i_3)\} \times \{1+(i_2/i_1)(e_{CVU}-1)\} \tag{2}$$

Further, a relationship between the two speed ratios $e_{CVU}$, $e_{CVT}$ when the notation $i_1$ is 2, $i_2$ is 2.2 and $i_3$ is 2.8 in the respective ratios is changed as shown by a line segment β in FIG. 11.

In the case of the continuously variable transmission apparatus constituted and operated as described above, as is apparent from the line segment α of FIG. 11, a state of so-to-speak infinity speed ratio in which the output shaft 38a is stopped while the input shaft 1 is brought into a rotated state can be created. However, in the state in which the output shaft 38a is stopped while the input shaft 1 is brought into the rotating state in this way or the output shaft 38a is rotated at an extremely low speed, as described above, the torque (passing torque) passing the toroidal type continuously variable transmission 25 becomes larger than the torque applied from the engine constituting the drive source to the input shaft 1. Therefore, in stopping or in running the vehicle at a very low speed, it is necessary to properly restrict the torque inputted from the drive source to the input shaft such that the passing torque does not become excessively large (or excessively small).

Further, in running at the very small speed, in the state in which the output shaft 38a is proximate to a state of being stopped, that is, in the state in which the transmission ratio of the continuously variable transmission apparatus is very large and the rotational speed of the output shaft 38a is considerably slower than the rotational speed of the input shaft 1, the torque applied to the output shaft 38a is considerably varied by a slight variation in the transmission ratio of the continuous variable transmission apparatus. Therefore, in order to ensure smooth driving operation, it is still necessary to property restrict the torque inputted from the drive source to the input shaft 1.

Further, in running at an accelerated speed or a constant speed in such a low speed mode state, similar to the above-described structure shown in FIG. 9, the passing torque is applied from the input shaft 1 to the output side disk 5a via the carrier 27a, the first planetary gear 42, the first sun gear 43 and the hollow rotating shaft 32a and applied further from the output side disk 5a to the respective input side disks 2, 2 via the respective power rollers 6, 6 (refer to FIG. 9). That is, in running at an accelerated speed or a constant speed, the passing torque is circulated in a direction in which the respective input side disks 2, 2 receive the torque from the respective power rollers 6, 6.

Therefore, in the case of a method and an apparatus of controlling a transmission ratio by the above-described structure, as shown by FIG. 12, the torque inputted from the drive source to the input shaft 1 is properly restricted. First, the rotational speed of the engine constituting the drive source is grossly controlled. That is, the rotational speed of the engine is restricted to a point a within a range of w of FIG. 12. Along therewith the transmission ratio of the toroidal type continuously variable transmission 25 which is needed to make the rotational speed of the input shaft 1 of the continuously variable transmission apparatus coincide with the controlled rotational speed of the engine is set. The setting operation is carried out base on Equation (1), mentioned above. That is, the torque transmitted from the engine to the input shaft 1 needs to strictly restrict by the above-described method in the so-to-speak low speed mode connecting the low speed clutch 40a and disconnecting the high speed clutch 41a. Therefore, in order to constitute the rotational speed of the input shaft 1 by a value in correspondence with the necessary rotational speed of the output shaft 38a, the transmission ratio of the toroidal type continuously variable transmission 25 is set by Equation (1), mentioned above.

Further, the pressure difference between the pair of hydraulic chambers 24a, 24b (refer to FIG. 8 and FIG. 14, mentioned later) constituting the hydraulic actuators 10, 10 for displacing the trunnions 7, 7 integrated to the toroidal type continuously variable transmission 25 in the axial direction of the pivot shafts 9, 9 is measured by a hydraulic pressure sensor 52 (refer to FIG. 2, mentioned later). The hydraulic pressure measuring operation is carried out in a state in which the rotational speed of the engine is controlled grossly (however, a state of maintaining the rotational speed constant) and the transmission ratio of the toroidal type continuously variable transmission 25 is set by Equation (1). Further, by the pressure difference calculated based on the measuring operation, the torque (passing torque) $T_{CVU}$ passing the toroidal type continuously variable transmission 25 is calculated.

That is, so far as the transmission ratio of the toroidal type continuously variable transmission 25 is constant, the pressure difference is proportional to the torque $T_{CVU}$ passing the toroidal type continuously variable transmission 25 and therefore, the torque $T_{CVU}$ can be calculated by the pressure difference. The reason is that as described above, the respective actuators 10, 10 support the force of 2 Ft having the magnitude proportional to the torque (=$T_{CVU}$ passing the toroidal type continuously variable transmission 25) transmitted from the input side disks 2, 2 to the output side disk 5a (or from the output side disk 5a to the input side disks 2, 2).

Meanwhile, the above-described torque $T_{CVU}$ can be calculated also by Equation (3) shown below.

$$T_{CVU} = e_{CVU} \times T_{IN} / \{e_{CVU} + (i_1 - 1)\eta_{CVU}\} \quad (3)$$

In Equation (3), notation $e_{CVU}$ designates the transmission ratio of the toroidal type continuously variable transmission 25, notation $T_{IN}$ designates the torque inputted from the engine to the input shaft 1, notation $i_1$ designates the teeth number ratio of the planetary gear transmission related to the first planetary gear 42 (a ratio of teeth number m49 of the ring gear 49 to a teeth number $m_{47}$ of the first sun gear 47) and notation $h_{CVU}$ designates an efficiency of the toroidal type continuously variable transmission 25.

Hence, based on a torque $T_{CVU1}$ in actually passing the toroidal type continuously variable transmission 25 calculated from the pressure difference and the passing torque $T_{CVU2}$ calculated from Equation (3) and constituting the target, a deviation $\Delta T$ (=$T_{CVU1} - T_{CVU2}$) between the actually passing torque $T_{CVU1}$ and the target value $T_{CVU2}$ is calculated. Further, the speed ratio of the toroidal type continuously variable transmission 25 is controlled in a direction of nullifying the deviation $\Delta T$ (a deviation is made to be $\Delta T=0$). Further, the deviation $\Delta T$ of the torque and the deviation of the pressure difference are brought into a proportional relationship and therefore, operation of controlling the transmission ratio is carried out not only by the deviation of the torque but also by the deviation of the pressure difference. That is, the change speed ratio controlled by the deviation of the torque and the change speed ratio controlled by the deviation of the pressure difference are the same technically.

For example, as shown in FIG. 12, consider a case in which the higher the rotational speed of the input shaft 1, the more rapidly the torque $T_{IN}$ for driving the input shaft 1 by the engine is changed in the lowering direction in the region of restricting the torque $T_{CVU1}$ (measured value) actually passing the toroidal type continuously variable transmission 25 to the target value $T_{CVU2}$. Such a characteristic of the engine is easily provided even at the low speed rotational region so far as the engine is an electronically controlled engine. In the case of having such an engine characteristic and in the case in which the measured value $T_{CVU1}$ of the torque is provided with a deviation in the direction in which the respective input side disks 2, 2 receive torque from the power rollers 6, 6 (refer to FIGS. 7 through 9) in comparison with the target value $T_{CVU2}$ of the same, the transmission ratio of the total of the continuously variable transmission apparatus is displaced to a decelerating side in order to increase the rotational speed of the engine to reduce the torque $T_{IN}$ for driving the input shaft 1. Therefore, the transmission ratio of the toroidal type continuously variable transmission 25 is changed to an accelerating side.

However, in a state in which the vehicle is stopped by depressing the brake pedal (rotational speed of output shaft=0), the transmission ratio of the toroidal type continuously variable transmission 25 is controlled within a range of capable of being absorbed by slip produced at inside of the toroidal type continuously variable transmission 25, that is, slip (creep) produced at contact portions (traction portions) between the inner side faces of the respective input side and output side disks 2, 5a and the peripheral faces of the respective power rollers 6, 6 (refer to FIGS. 7 through 9). Therefore, an allowable range capable of controlling the speed ratio stays in a range in which unreasonable force is not exerted to the control portion and is limited in comparison of the case of running at a low speed.

For example, when the target value $T_{CVU2}$ is present at point a in FIG. 12 and the measured value $T_{CVU1}$ is present at a point b of the drawing, there is brought about a state having the deviation in a direction in which the respective input side disks 2, 2 receive the torque from the power rollers 6, 6. Hence, the speed ratio $e_{CVU}$ of the toroidal type continuously variable transmission 25 is changed to the accelerating side and the speed ratio $e_{CVT}$ of the total of the continuously variable transmission apparatus (T/M) is changed to the decelerating side. In accordance therewith, the rotational speed of the engine is increased and the torque is reduced. On the contrary, when the measured value $T_{CVU1}$ is present at a point c of the drawing, there is brought about the state of having the deviation in a direction in which the input side disks 2, 2 apply the torque to the power rollers 6, 6. In this case, contrary to the above-described case, the speed ratio $e_{CVU}$ of the toroidal type continuously variable transmission 25 is changed to the decelerating side and the speed ratio $e_{CVT}$ of the total of the continuously variable transmission apparatus (T/M) is changed to the accelerating side. In accordance therewith, the rotational speed of the engine is reduced and the torque is increased.

In the following, the above-described operation is repeatedly carried out until the torque $T_{CVU1}$ actually passing the toroidal type continuously variable transmission 25 which is calculated from the pressure difference coincides with the target value. That is, when the torque $T_{CVU1}$ passing the toroidal type continuously variable transmission 25 cannot be made to coincide with the target value $T_{CVU2}$ by controlling to change the speed of the toroidal type continuously variable transmission 25 by a single time, the above-described operation is repeatedly carried out. As a result, the torque $T_{IN}$ for driving to rotate the input shaft 1 by the engine can be made to be proximate to the value by which the toque $T_{CVU}$ passing the toroidal continuously variable transmission 25 is constituted by the target value $T_{CVU2}$. Further, such an operation is carried out automatically and in a short period of time by instruction from a microcomputer integrated to a controller of the continuously variable transmission apparatus.

Further, FIG. 13 shows a relationship among a ratio of the torque $T_{CVU}$ passing the toroidal type continuously variable transmission 25 to the torque $T_{IN}$ for driving to rotate the input shaft 1 by the engine (left side ordinate), the speed ratio $e_{CVT}$ of the total of the continuously variable transmission apparatus (abscissa), and the speed ratio $e_{CVU}$ of the toroidal type continuously variable transmission 25 (right side ordinate). A bold line a shows the relationship between the ratio of the passing torque $T_{CVU}$ to the drive torque $T_{IN}$ and the speed ratio $e_{CVT}$ of the total of the continuously variable transmission apparatus, and a broken line b shows the relationship between the two speed ratios $e_{CVT}$ and $e_{CVU}$, respectively. The above-described structure restricts the speed ratio $e_{CVU}$ of the toroidal type continuously variable transmission 25 in order to restrict the torque $T_{CVU1}$ actually passing the toroidal type continuously variable transmission 25 to the target value ($T_{CVU2}$) represented by a point on the bold line a in a state in which the speed ratio $e_{CVT}$ of the total of the continuously variable transmission apparatus is restricted to the predetermined value.

In the case of the above-described structure, the control for restricting the torque $T_{CVU1}$ actually passing the toroidal type continuously variable transmission 25 to the point on the bold line "a" as the target value $T_{CVU2}$ is divided in two stages, that is, the rotational speed of the engine is grossly controlled to a rotational speed which seems to provide the target value $T_{CVU2}$ and thereafter, the transmission ratio control of the toroidal type continuously variable transmission 25 is carried out in accordance with the rotational speed. Therefore, the torque $T_{CVU1}$ actually passing the toroidal type continuously variable transmission 25 can be restricted to the target value $T_{CVU2}$ without producing overshooting (and hunting accompanied thereby) as in the method of the above-described structure, or by restraining the overshooting to be low to a degree of not being problematic practically even when the overshooting is assumedly produced.

Further, as described above, a drive force (torque) is applied to the output shaft 38a (FIG. 10) in a state of depressing the brake pedal to stop the vehicle based on the slip produced at inside of the toroidal type continuously variable transmission 25. It is conceivable to set the magnitude of the torque compatible with the creep force produced in a general automatic transmission having a torque converter which has been spread conventionally. The reason is for preventing a driver accustomed to operation of the general automatic transmission from being given a strange feeling. Further, a direction of the torque is determined by an operating position of the operating lever provided at the driver's seat. When a forward moving direction position (D range) is selected by the operating lever, the output shaft 38a is applied with the torque in the forward moving direction and when a rearward moving direction position (R range) is selected thereby, the output shaft 38a is applied with the torque in the rearward moving direction.

Next, an explanation will be given of a circuit of a portion of controlling the speed ratio of the toroidal type continuously variable transmission 25 in order to make the torque $T_{CVU1}$ actually passing the toroidal type continuously variable transmission 25 coincide with the target value $T_{CVU2}$ as described above in reference to FIG. 14. The pressurized oil is made to be chargeable and dischargeable to and from the pair of hydraulic chambers 24a, 24b constituting the hydraulic actuator 10 for displacing the trunnion 7 in an axial direction (up and down direction of FIG. 14) of the pivot shafts 9, 9 (refer to FIG. 8) via the control valve 12. The sleeve 14 constituting the control valve 12 is made to be displaceable in an axial direction by the stepping motor 13 via a link arm 54 and a rod 53. The spool 15 constituting the control valve 12 is engaged with the trunnion 7 via the link arm 19, and the precess cam 18 and the rod 17 and is made to be displaceable in the axial direction in accordance with an axial direction displacement and a swinging displacement of the trunnion 7. The above-described constitution is basically the same as the transmission ratio control mechanism of the toroidal type continuously variable transmission which has conventionally been known.

Particularly in the case of the above-described structure, in addition to driving the sleeve 14 by the stepping motor 13, the sleeve 14 is made to be driven also by a hydraulic pressure difference cylinder 55. That is, a front end portion of the rod 53 a base end portion of which is coupled to the sleeve 14 is axially supported by a middle portion of the link arm 54 and a pin provided at an output portion of the stepping cylinder motor 13 or the pressure difference cylinder 55 is engaged with a long hole provided at each of both end portions of the link arm 54. When the pin at inside of the long hole provided at one end portion of the link arm 54 is pushed or pulled, the pin at inside of the long hole at other end portion thereof constitutes a fulcrum. By such a constitution, the sleeve 14 is made to be displaced in the axial direction not only by the stepping motor 13 but also by the pressure difference cylinder 55. In the case of the above-described structure, by displacement of the sleeve 14 by the pressure difference cylinder 55, the speed ratio $e_{CVU}$ is controlled in accordance with the torque $T_{CVU}$ passing the toroidal type continuously variable transmission 25.

Therefore, in the case of the above-described structure, hydraulic pressures different from each other can be introduced into a pair of hydraulic chambers 56a, 56b provided at the pressure difference cylinder 55 via a correcting control valve 57. The hydraulic pressures introduced into respective hydraulic chambers 56a, 56b are determined based on a pressure difference ΔP between hydraulic pressures $P_{DOWN}$ and $P_{UP}$ operated to insides of the pair of hydraulic chambers 24a, 24b constituting an actuator 10 and a pressure difference $\Delta P_O$ of output pressures of a pair of electromagnetic valves 58a, 58b for controlling an opening degree of the correcting control valve 57. That is, opening and closing of the two electromagnetic valves 58a, 58b are calculated by a controlling apparatus (controller), not illustrated, and controlled based on an output signal outputted from the controller such that the pressure difference $\Delta P_O$ between the two electromagnetic valves 58a, 58b becomes a target pressure difference in correspondence with the target torque $T_{CVU2}$ of the toroidal type continuously variable transmission 25. Therefore, a spool 59 constituting the correcting control valve 57 is operated with a force in accordance with the pressure difference $\Delta P$ between the hydraulic pressures operated to insides of the hydraulic chambers 24a, 24b of the actuator 10 and the pressure difference $\Delta P_O$ between output pressures of the electromagnetic valves 58a, 58b constituting the target pressure difference in correspondence with the target torque $T_{CVU2}$ constituting a force thereagainst.

When the torque $T_{CVU1}$ actually passing the toroidal type continuously variable transmission 25 and the target torque $T_{CVU2}$ coincide with each other, that is, when the difference $\Delta T$ between the passing torque $T_{CVU1}$ and the target torque $T_{CVU2}$ is null, a force in accordance with the pressure difference $\Delta P$ between the pressures operated to the hydraulic chambers 24a, 24b of the actuator 10 and a force in accordance with the pressure difference $\Delta P$ between output pressures of the electromagnetic valves 58a, 58b are balanced. Therefore, the spool 59 constituting the correcting control valve 57 is disposed at a neutral position and also pressures operated to the hydraulic chambers 56a, 56b of the pressure difference cylinder 55 become equal to each other. Under the state, the spool 60 of the pressure difference cylinder 55 is disposed at a neutral position and the speed ratio of the toroidal type continuously variable transmission 25 remains unchanged (not corrected).

Meanwhile, when a difference is produced between the torque $T_{CVU1}$ actually passing the toroidal type continuously variable transmission 25 and the target torque $T_{CVU2}$, a balance between the force in accordance with the pressure difference $\Delta P$ between hydraulic pressures operated to the hydraulic chambers 24a, 24b of the actuator 10 and the force in accordance with the pressure difference $\Delta P_O$ between output pressures of the electromagnetic valves 58a, 58b is not established. Further, in accordance with a magnitude and a direction of the difference $\Delta T$ between the passing torque $T_{CVU1}$ and the target torque $T_{CVU2}$, the spool 59 constituting the correcting control valve 57 is displaced in an axial direction and pertinent hydraulic pressures in accordance with the magnitude and the direction of $\Delta T$ are introduced into the hydraulic chambers 56a, 56b of the pressure difference cylinder 55. Further, a spool 60 of the pressure difference cylinder 55 is displaced in the axial direction and in accordance therewith, the sleeve 14 constituting the control valve 12 is displaced in the axial direction. As a result, the trunnion 7 is displaced in the axial directions of the pivot shafts 9, 9 and the speed ratio of the toroidal type continuously variable transmission 25 is changed (corrected) Further, the direction of changing the speed ratio and the amount of changing the speed ratio in this way are as explained in reference to FIGS. 12 to 13. Further, an amount of displacing the speed ratio of the toroidal type continuously variable transmission 25 in this way, that is, the corrected amount (amount of correcting speed ratio) is sufficiently smaller than a width of the speed ratio of the toroidal type continuously variable transmission 25. Therefore, the stroke of the spool 60 of the pressure difference cylinder 55 is made to be sufficiently smaller than a stroke of the output portion of the stepping motor 13. Further, the stroke of the spool 60 restrained to be small in this way correspond to a "mechanically limited range".

In the case of embodying the continuously variable transmission apparatus according to the above-described structure, even when the vehicle is stationary, it is preferable to strictly carry out the speed ratio control of the toroidal type continuously variable transmission integrated to the continuously variable transmission apparatus. For example, when the vehicle is stationary, it is not preferable to apply a torque which is not intended by a driver suddenly to the output shaft at an instance of switching a state of selecting a parking range (P) or a neutral range (N) constituting a state in which the vehicle is not run (no-running condition) by a select lever provided at a driver's seat to a drive range (D) or a reverse range (R) constituting a state of running the vehicle. It is preferable that the torque applied to the output shaft at the instance is equal to null or a torque to a degree of being applied thereto at an instance of switching from the P range or the N range to the D range or the R range in a general automatic transmission.

Therefore, it is preferable that the torque applied to the output shaft is null or converged to a small value even when the state of running the vehicle is assumedly selected at the instance by controlling the speed ratio of the toroidal type continuously variable transmission also in the state in which the vehicle is not run (no-running condition). Such a control can theoretically be carried out by displacing the actuators 10, 10 integrated to the toroidal type continuously variable transmission 25 as shown by FIGS. 6 through 8 in the predetermined direction by the predetermined amount and displacing to swing the respective trunnions 7, 7 supporting the power rollers 6, 6 in the predetermined direction by the predetermined angle centering on the respective pivot shafts 9, 9.

However, a number of parts integrated to the toroidal type continuously variable transmission 25 is large, further, dimensional accuracies and integrating accuracies of a number of parts thereamong effect an influence on the transmission ratio of the toroidal type continuously variable transmission 25. Therefore, when a plurality of the toroidal type continuously variable transmissions 25 are considered, even when displacement amounts of the respective actuators 10, 10 integrated to the respective toroidal type continuously variable transmissions 25 are made to be constant, it is unavoidable to some degree that a difference (individual difference) is produced in the speed ratios realized by the respective toroidal type continuously variable transmissions 25. When a single one of the toroidal type continuously variable transmission 25 is used as is carried-out currently, the above-described individual difference hardly poses a problem unless the individual difference is remarkable. In contrast thereto, according to the continuously variable transmission apparatus constituting an object of the invention, when the running state is selected, in order to converge the torque applied to the output shaft to null or a small value, it is necessary to strictly control the transmission ratio of the toroidal type continuously variable transmission 25 to a considerable degree and the individual difference poses a problem.

SUMMARY OF THE INVENTION

It is an object of the invention to solve the above problems.

The object can be achieved by a continuously variable transmission apparatus according to the present invention, comprising: an input shaft; an output shaft; a toroidal type continuously variable transmission; a differential unit of a gear type constituted by combining a plurality of gears; and a controller for changing a transmission ratio of the toroidal type continuously variable transmission.

In the continuously variable transmission apparatus, the toroidal type continuously variable transmission comprises: an input side disk driven to rotate by the input shaft; an output side disk concentrically supported with the input side disk and rotatable relative to the input side disk; a plurality of power rollers interposed between the input side disk and the output side disk; a plurality of support members rotatably supporting the respective power rollers; and an actuator, for changing the transmission ratio between the input side disk and the output side disk, by displacing the respective support members.

In the continuously variable transmission apparatus, the differential unit comprises: a first input portion rotated with the input side disk by a rotation of the input shaft; and a second input portion connected to the output side disk, wherein the differential unit transmits rotation to the output shaft in accordance with a speed difference between the first and the second input portions.

Moreover, the continuously variable transmission apparatus further comprises an input side rotation sensor for detecting a rotational speed of the input side disk; and an output side rotation sensor for detecting a rotational speed of the output side disk.

In particular, in the continuously variable transmission apparatus, wherein the controller converts a rotational state of the output shaft to regular rotation and reverse rotation by interposing a stationary state while the input shaft is brought into a state of being rotated in one direction, by changing relative displacement speeds of the plurality of gears constituting the differential unit by controlling the transmission ratio of the toroidal type continuously variable transmission, further, the controller calculates a rotational speed of the output shaft, based on the rotational speed of the input side disk detected by the input side rotation sensor, the rotational speed of the output side disk detected by the output side rotation sensor, and a gear ratio of the differential unit, and if a no-running condition in which rotation of the input shaft is not transmitted to the output shaft is selected, the controller controls the transmission ratio of the toroidal type continuously variable transmission, so that the rotational speed of the output shaft becomes null.

Further, in the continuously variable transmission apparatus, the controller controls a torque transmitted through the toroidal type continuously variable transmission by changing the transmission ratio of the toroidal type continuously variable transmission.

Further, in the continuously variable transmission apparatus, the controller controls the transmission ratio of the toroidal type continuously variable transmission in order to nullify the rotational speed of the output shaft, if a target value of the torque transmitted through the toroidal type continuously variable transmission is set to null.

Further, in the continuously variable transmission apparatus, a signal for displacing the actuator in a state of nullifying the rotational speed of the output shaft is learnt and stored as a signal for stopping the output shaft while rotating the input shaft.

Moreover, the object can be achieved by a continuously variable transmission apparatus according to the present invention, comprising: an input shaft; an output shaft; a toroidal type continuously variable transmission; a differential unit of a gear type constituted by combining a plurality of gears; and a controller for changing a transmission ratio of the toroidal type continuously variable transmission, wherein the toroidal type continuously variable transmission comprises: an input side disk driven to rotate by the input shaft; an output side disk concentrically supported with the input side disk and rotatable relative to the input side disk; a plurality of power rollers interposed between the input side disk and the output side disk; a plurality of support members rotatably supporting the respective power rollers; and an actuator, for changing the transmission ratio between the input side disk and the output side disk, by displacing the respective support members, and the differential unit comprises: a first input portion rotated with the input side disk by a rotation of the input shaft; and a second input portion connected to the output side disk, wherein the differential unit transmites rotation to the output shaft in accordance with a speed difference between the first and the second input portions, further comprising: an-input side rotation sensor for detecting a rotational speed of the input side disk; and an output side rotation sensor for detecting a rotational speed of the output side disk, wherein the controller converts a rotational state of the output shaft to regular rotation and reverse rotation by interposing a stationary state while the input shaft is brought into a state of being rotated in one direction, by changing relative displacement speeds of the plurality of gears constituting the differential unit by controlling the transmission ratio of the toroidal type continuously variable transmission, the controller controls a toque transmitted through the toroidal type continuously variable transmission by changing the transmission ratio of the toroidal type continuously variable transmission within a mechanically limited range, and if a no-running condition in which rotation of the input shaft is not transmitted to the output shaft is selected, the controller controls the transmission ratio of the toroidal type continuously variable transmission, so that the torque transmitted through the toroidal type continuously variable transmission is set to a value other than null, and that a speed ratio between the input side disk and the output side disk calculated by detected signals of the input side and the output side of rotation detecting sensors becomes a predetermined value.

Further, in the continuously variable transmission apparatus, the controller learns and stores a signal, for displacing the actuator in a state in which the transmission ratio of the toroidal type continuously variable transmission is controlled such that the speed ratio between the input side disk and the output side disk becomes the predetermined value, as a signal for enabling to stop the output shaft while the input shaft is made to stay to be rotated.

Further, the continuously variable transmission apparatus comprises a select lever at a driver's seat, wherein, if the select lever is positioned at a parking range or a neutral range, the selection of the no-running condition is detected.

Further, the continuously variable transmission apparatus further comprises: a control valve, for changing the transmission ratio of the toroidal type continuously variable transmission, including a constituent member operated by an output rod of a motor and a spool of a pressure difference cylinder, wherein a displacing direction of the constituent member, when the no-running condition is selected, is uniquely restricted.

Further, in the continuously variable transmission apparatus, a feeding of a pressurized oil to a pair of pressure chambers constituting the pressure difference cylinder is restricted based on a displacement in an axial direction of the spool constituting a forward/rearward switch valve, and a position in an axial direction of the spool is uniquely restricted by a spring included in the forward/rearward switch valve in a state in which a hydraulic pressure is not introduced into the forward/rearward switch valve.

In the case of the continuously variable transmission apparatus of the invention constituted as described above, despite the individual difference of the toroidal type continuously variable transmission, the transmission ratio of the toroidal type continuously variable transmission can strictly be restricted in order to converge the torque applied to the output shaft to null or a small value when the running state is selected.

That is, there is not the individual difference in the gear ratio of the differential unit of a gear type. Therefore, so far as the transmission ratio of the toroidal type continuously variable transmission can strictly be restricted, the transmission ratio of the continuously variable transmission 20 apparatus constituted by combining the toroidal type continuously variable transmission and the differential unit can strictly be controlled.

Therefore, in the case of the invention, the transmission ratio of the toroidal type continuously variable transmission is calculated from the rotational speed of the input side disk and the rotational speed of the output side disk. Therefore, the actual transmission ratio of the toroidal type continuously variable transmission can accurately be calculated regardless of dimensional accuracies and integrating accuracies of a number of parts constituting the toroidal type continuously variable transmission. Further, when the vehicle is not run, the actuator integrated to the toroidal type continuously variable transmission is displaced while calculating the accurate transmission ratio, and the torque applied to the output shaft is converged to null or a small value when needed. Therefore, a speed at which the output shaft starts rotating at an instance of switching from the state in which the vehicle is not run to the state of running the vehicle and a torque applied to the output shaft as necessary can strictly be controlled regardless of the individual difference of the toroidal type continuously variable transmission.

DETAILED DESCRIPTION OF THE PREFERRED EMBODIMENTS

Figure 1:
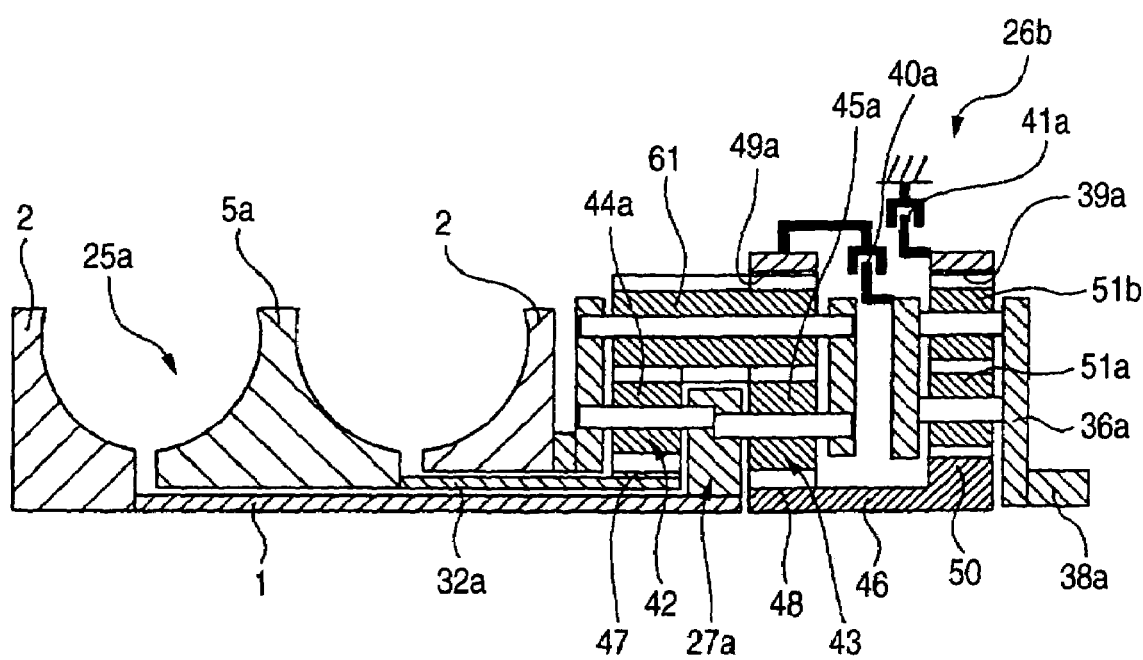
FIG. 1 is an outline sectional view of a half portion of a continuously variable transmission apparatus showing a first example of an embodiment of the invention.
Figure 2:
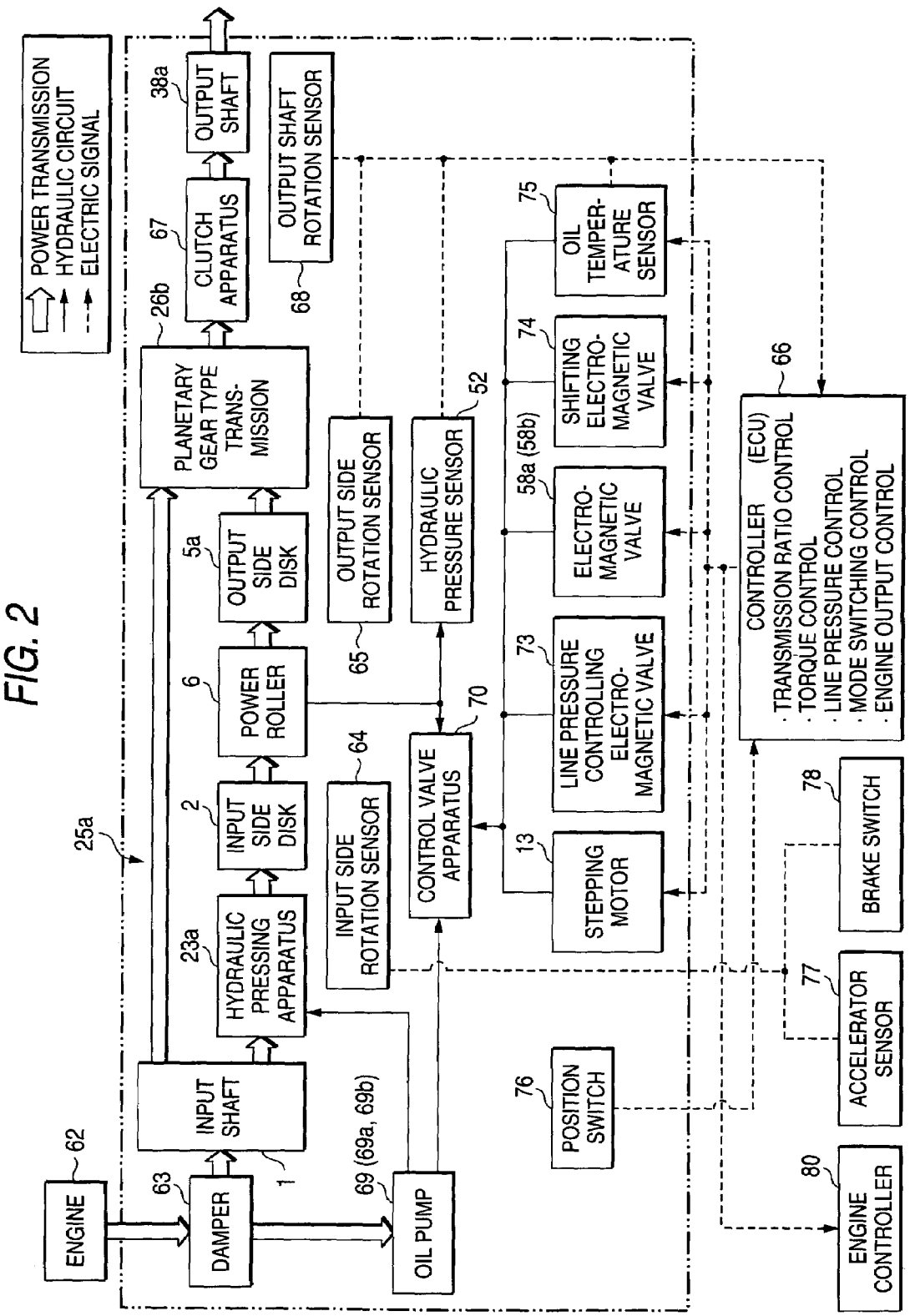
FIG. 2 is a block diagram of a variable speed control apparatus of the same.
Figure 3:
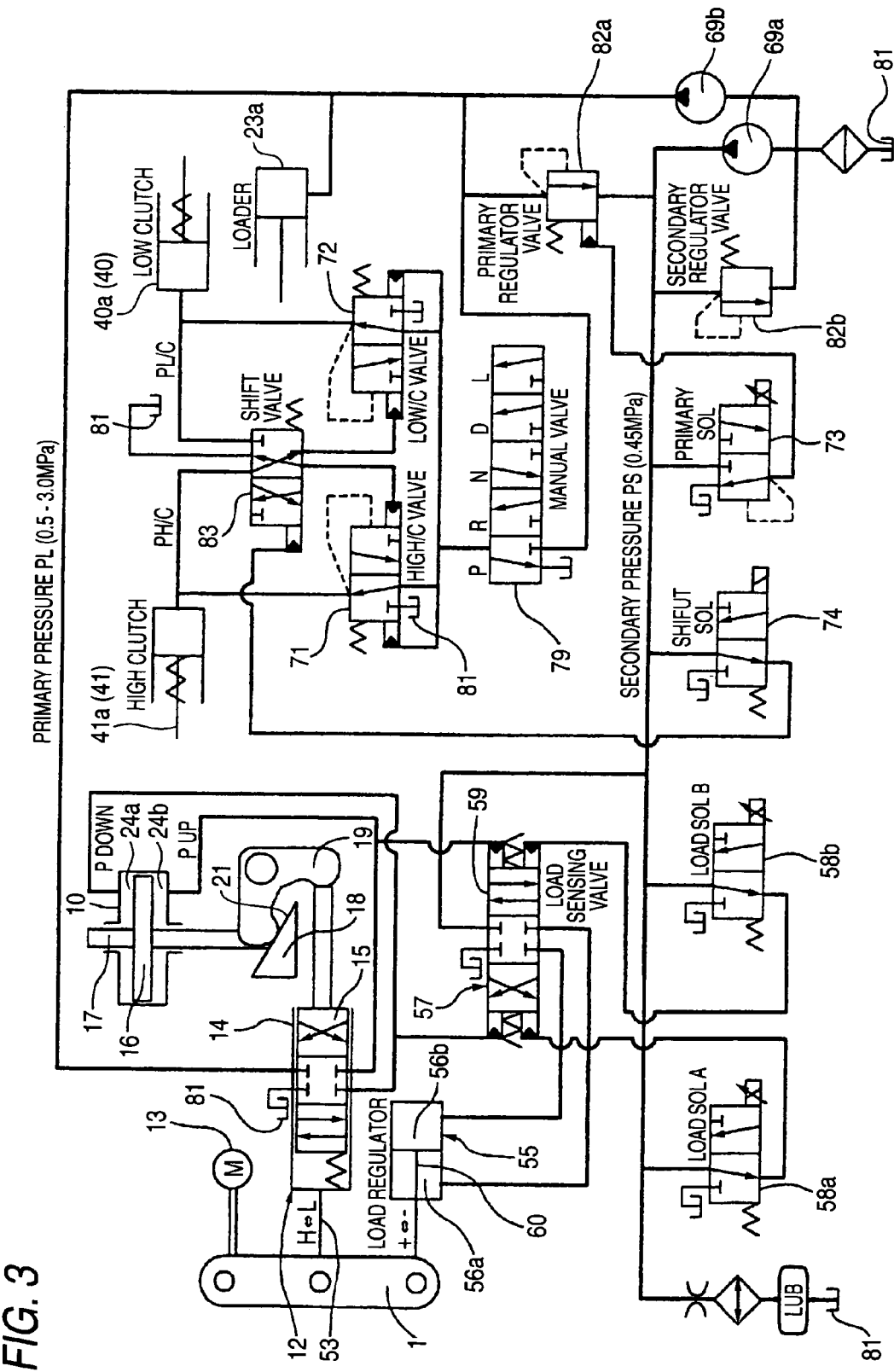
FIG. 3 is a hydraulic circuit diagram showing a mechanism for controlling a transmission ratio of a toroidal type continuously variable transmission integrated to the continuously variable transmission apparatus.

FIGS. 1 through 3 show a first example of an embodiment of the invention. FIG. 1 shows an example of a continuously variable transmission apparatus constituted by combining a toroidal type continuously variable transmission 25a and a planetary gear type transmission 26b constituting a differential unit. The constitution of the continuously variable transmission apparatus is basically similar to the continuously variable transmission apparatus of the prior art shown in FIG. 9 or of the structure shown in FIG. 10, mentioned above. Particularly, in the case of the continuously variable transmission apparatus of the example, among respective planetary gear elements constituting the first and the second planetary gears 42, 43 of the planetary gear type transmission 26b, there is used a planetary gear element 61 provided on an outer side in a diameter direction which is prolonged in an axial direction. Further, the planetary gear element 61 is brought in mesh with the respective planetary gear elements 44a, 45a provided on an inner side in the diameter direction. Further, there is used a ring gear 49a brought in mesh with the planetary gear element 61 having a small width dimension. According to such a structure shown in FIG. 1, light-weighed formation of the continuously variable transmission apparatus can be achieved by reducing a volume thereof by shortening a dimension in an axial direction of the ring gear 49a having the large diameter. A function of the continuously variable transmission apparatus is the same as that of the continuously variable transmission apparatus of the prior art shown in FIG. 9 or of the structure shown in FIG. 10, mentioned above.

Successively, an explanation will be given of the continuously variable transmission apparatus of the example in reference to the block diagram of FIG. 2 on the premise of FIG. 1. In FIG. 2, a bold arrow mark indicates a path of transmitting power, a bold line indicates a hydraulic circuit and a broken line indicates an electric circuit, respectively. Power of an engine 62 is inputted to the input shaft 1 via a damper 63. The damper 63 thereamong serves as an elastic joint for smoothing rotation of the engine 62 to transmit the input shaft 1. Further, a characteristic of the invention resides in accurately measuring a rotational speed and a rotational direction of the output shaft 38a when a vehicle resides at an extremely low speed or is stationary in order to strictly control a torque applied to the output shaft 38a by passing the toroidal type continuously variable transmission 25a. The structure of the continuously variable transmission apparatus per se is as shown by FIG. 1, mentioned above, and therefore, an explanation will be given of portions of FIG. 2 different from those of FIG. 1 by attaching notations used in FIG. 1 as much as possible.

Power transmitted to the input shaft 1 is transmitted from a hydraulic pressing apparatus 23a constituting the toroidal type continuously variable transmission 25a to the input side disk 2 and transmitted to the output side disk 5a via the power rollers 6. In the two-disks 2, 5a, a rotational speed of the input side disk 2 is measured by an input side rotation sensor 64 and a rotational speed of the output side disk 5a is measured by an output side rotation sensor 65, respectively, to input to a controller 66, and a transmission ratio (speed ratio) between the two disks 2, 5a (of the toroidal type continuously variable transmission 25a) is made to be able to calculate. Further, power transmitted to the input shaft 1 is transmitted to the planetary gear type transmission 26b constituting the differential unit directly or via the toroidal type continuously variable transmission 25a. Further, a difference component of the planetary gear type transmission 26b is outputted to the output shaft 38a via a clutch apparatus 67. Further, the clutch apparatus 67 represents the low speed clutch 40a and the high speed clutch 41a shown in FIG. 1, mentioned above, and FIG. 3, mentioned later. Further, in the case of the example, the rotational speed of the output shaft 38a is made to be able to detect also by an output shaft rotation sensor 68. However, the output shaft rotation sensor 68 is installed for failsafe for determining presence or absence of a failure of the input side rotation sensor 64 and the output side rotation sensor 65 and is not indispensable in embodying the invention.

Figure 8:
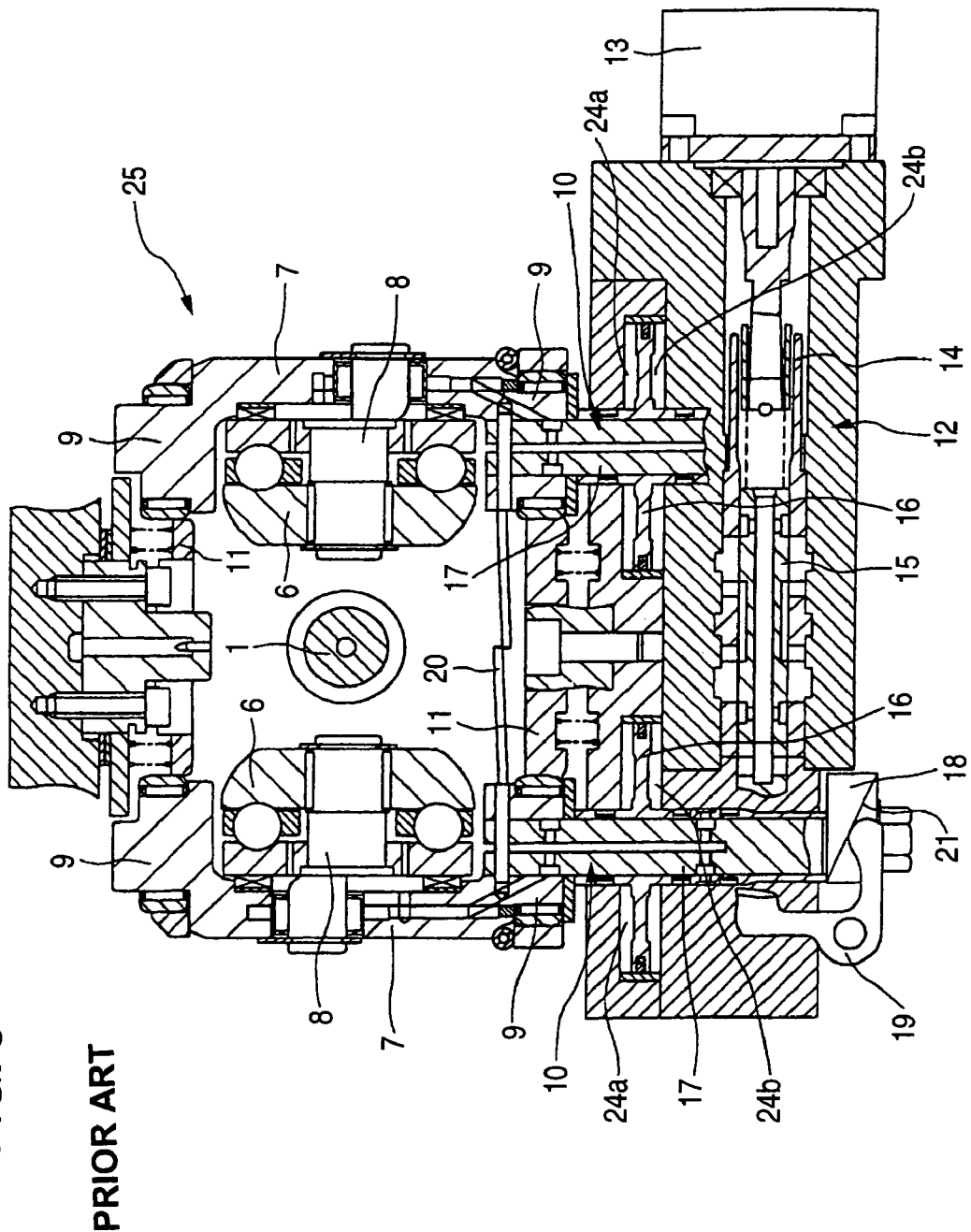
FIG. 8 is a sectional view taken along a line B—B of the same.
Figure 14:
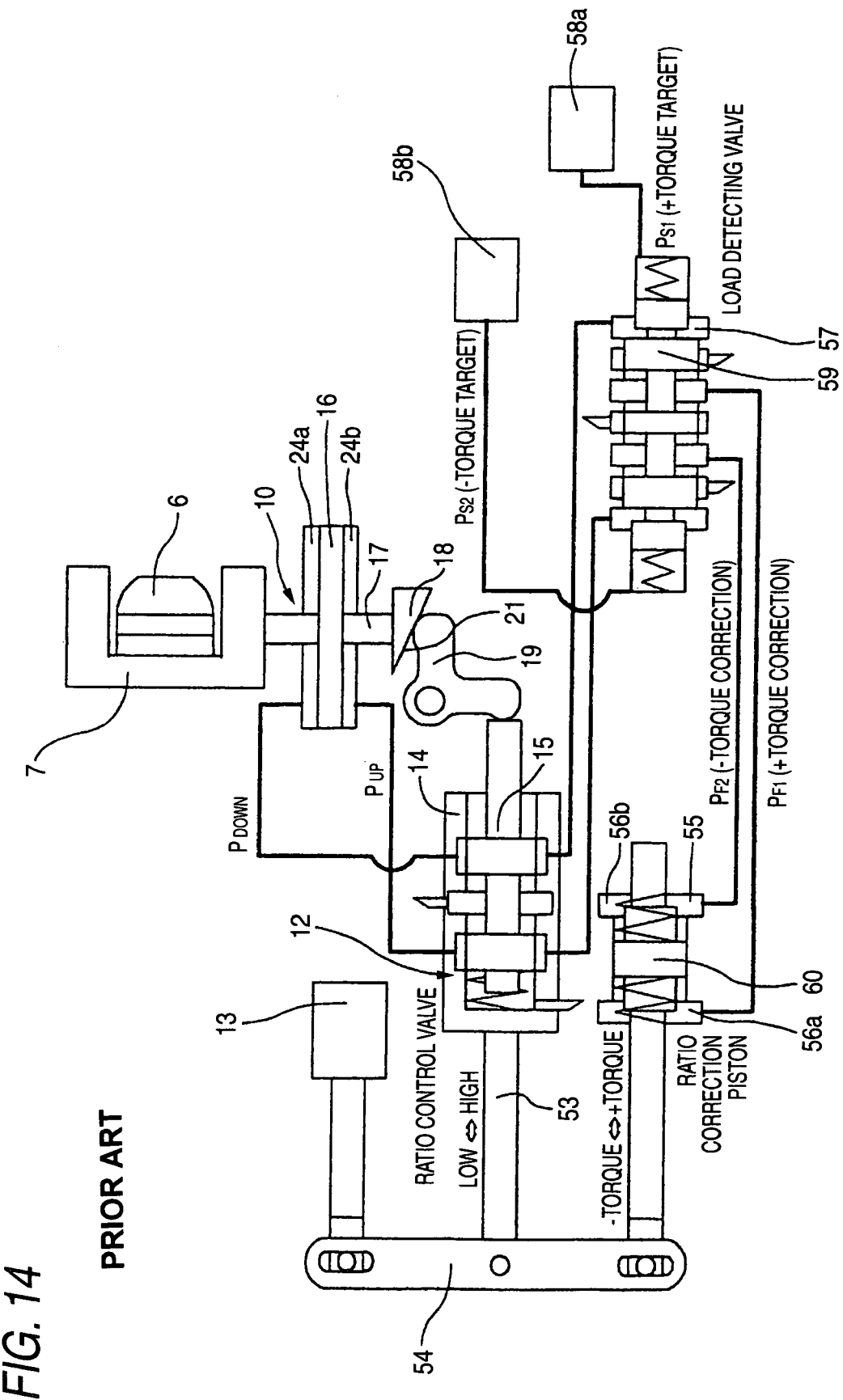
FIG. 14 is a hydraulic circuit diagram showing a mechanism for controlling a transmission ratio of a toroidal type continuously variable transmission constituting the continuously variable transmission apparatus shown in FIG. 10.

Meanwhile, an oil pump 69 is driven by power outputted from a portion of the damper 63 and pressurized oil delivered from the oil pump 69 is made to be able to be fed to the pressing apparatus 23a and a control valve apparatus 70 for controlling a displaced amount of the actuator 10 that displaces trunnions 7 supporting power rollers 6 (refer to FIGS. 3, 8, 14). Further, the control valve apparatus 70 is constituted by combining the control valve 12, the pressure difference cylinder 55, and the correcting control valve 57 shown in FIG. 14, mentioned above, and a high speed switch valve 71 and a low speed switch valve 72 described in FIG. 3, mentioned later. Further, hydraulic pressures in the pair of hydraulic chambers 24a, 24b (refer to FIGS. 3, 8, 14) provided to the actuator 10 are detected by (actually, a pair of) the hydraulic pressure sensors 52 and a detected signal thereof is inputted to the controller 66. The controller 66 calculates the passing torque of the toroidal type continuously variable transmission 25a based on the signal from the hydraulic sensor 52.

Further, an operational state of the control valve apparatus 70 can be switched by the stepping motor 13, a line pressure controlling electromagnetic opening/closing valve 73, the electromagnetic valve 58a (58b) for switching the correcting control valve 57, and a shifting electromagnetic valve 74 for switching a high speed switch valve 71 and a low speed switch valve 72. Further, all of the stepping motor 13, the line pressure controlling electromagnetic opening/closing valve 73, the electromagnetic valve 58a (58b) and the shifting electromagnetic valve 74 are switched by control signals from the controller 66.

Further, the controller 66 is inputted with a detected signal of an oil temperature sensor 75, a position signal of is a position switch 76, a detected signal of an accelerator sensor 77 and a signal of a brake switch 78 other than the signals from the respective rotation sensors 64, 65, 68 and the hydraulic pressure sensor 52. The oil temperature sensor 75 thereamong detects the temperature of a lubricant oil (traction oil) in a casing containing the continuously variable transmission apparatus. Further, the positioning switch 76 is for outputting a signal indicating a position of operating a shift lever provided at a driver's seat for switching a manual a hydraulic switch valve 79 described in FIG. 3, mentioned later. Further, the accelerator sensor 77 is for detecting an opening degree of an accelerator pedal. Further, the brake switch 78 detects depression of the brake pedal or operation of the parking brake and outputs a signal indicating the depression or the operation.

The controller 66 transmits the control signals to the stepping motor 13, the line pressure controlling electromagnetic opening/closing valve 73, the electromagnetic valve 58a (58b) and the shifting electromagnetic valve 74 based on the signals from the respective switches 76, 78 and the respective sensors 52, 64, 65, 68, 75, 77 and transmits a control signal to an engine controller 80 for controlling the engine 62. Further, similar to the structure shown in FIG. 10, the controller 66 changes the speed ratio between the input shaft 1 and the output shaft 38a or controls the torque (passing torque) applied to the output shaft 38a by passing the toroidal type continuously variable transmission 25a when the vehicle is stationary or run at an extremely low speed.

Particularly, in the case of the example, based on the detected signals of the input side rotation sensor 64 and the output side rotation sensor 65, the rotational speed and the rotational direction of the output shaft 38a are calculated and the passing torque is controlled. That is, the controller 66 inputted with the detected signals of the two input side and output side rotation sensors 64, 65 calculates a rotational speed $N_{ID}$ of the respective input side disks 2, 2 and a rotational speed $N_{OD}$ of the output side disk 5a based on the two rotation sensors 64, 65. So far as the input shaft 1 is driven to rotate by the engine 62, all of the respective input side disks 2, 2 and the output side disk 5a are rotated by sufficient speeds. Therefore, the rotational speeds of the respective disks 2, 5a can firmly be calculated by the two sensors 64, 65.

Further, from a transmission ratio $N_{OD}/N_{ID}$ (sign of which is reverse to that of the speed ratio $e_{CVU}$) of the toroidal type continuously variable transmission 25a calculated from the rotational speed $N_{ID}$ of the respective input side disks 2, 2 and the rotational speed $N_{OD}$ of the output side disk 59, and the gear ratio $i_1$ of the planetary gear type transmission 26b in the low speed mode state connected with the low speed clutch 40a, by Equation (4), shown below, the rotational speed $N_{OUT}$ of the output shaft 38a is calculated as a ratio to the rotational speeds of the respective input side disks 2, 2. Further, the gear ratio $i_1$ is a ratio of a teeth number $m_{49}$ of the ring gear 49a and a teeth number $mm_{47}$ of the first sun gear 47 ($i_1 = m_{49}/m_{47}$).

$$N_{OUT} = (i_1 - 1 - N_{OD}/N_{ID})/i_1 \tag{4}$$

Therefore, an absolute value of the rotational speed of the output shaft 38a becomes $N_{OUT} \times N_{ID}$. Further, as is apparent from Equation (4), when $N_{OD}/N_{ID}=i_1-1$, the output shaft 38a is stopped, when $N_{OD}/N_{ID}>i_1-1$, the output shaft 38a is rotated in a direction of moving the automobile rearward and when $N_{OD}/N_{ID<i1}-1$, the output shaft 38a is rotated in a direction of moving the automobile forward.

Further, to embody the invention by the above-described constitution, in the case of the continuously variable transmission apparatus of the example, when the state (no-running condition) in which the vehicle is not run (P range or N range), that is "no-running conditions", is selected based on the signal of the position switch 76, the controller 66 disconnects the low speed clutch 40a and the high speed clutch 41a. Under the state, rotation of the input shaft 1 is not transmitted to the output shaft 38a regardless of the transmission ratio of the toroidal type continuously variable transmission 25a. Further, the torque passing the toroidal type continuously variable transmission 25a is substantially null (except a torque compatible with a small friction resistance). However, even under the state, when the transmission ratio of the toroidal type continuously variable transmission 25a is not pertinently restricted, there is a possibility that the output shaft 38a suddenly starts rotating by a torque more than necessary and a speed more than necessary at an instance of connecting a running state (D range or R range) successively. When such a situation is brought about, a strange feeling is given to a driver and an adverse influence is effected on durabilities of respective portions.

Hence, in a first aspect, the transmission ratio of the toroidal type continuously variable transmitter 25a is restricted such that the rotational speed of the output shaft 38a becomes null even when the two clutches 40a, 41a are connected. Preferably, the transmission ratio of the toroidal type continuously variable transmission 25a is controlled in a state of making the target value of the torque passing the toroidal type continuously variable transmission 25a to null (which is a value of a substantial passing torque in the state in which the vehicle is not run (no-running condition) as described above). Further, in a second aspect, the transmission ratio of the toroidal type continuously variable transmission 25a is controlled such that the rotational speed of the output shaft 38a in the case of connecting the two clutches 40a, 41a becomes a low speed to a degree by which the vehicle is stopped by depressing the brake pedal and the torque applied to the output shaft 38a is reduced. In any of the aspects, the structure illustrated in the drawings remains the same and therefore, an explanation will be given of the respective cases as follows.

Figure 10:
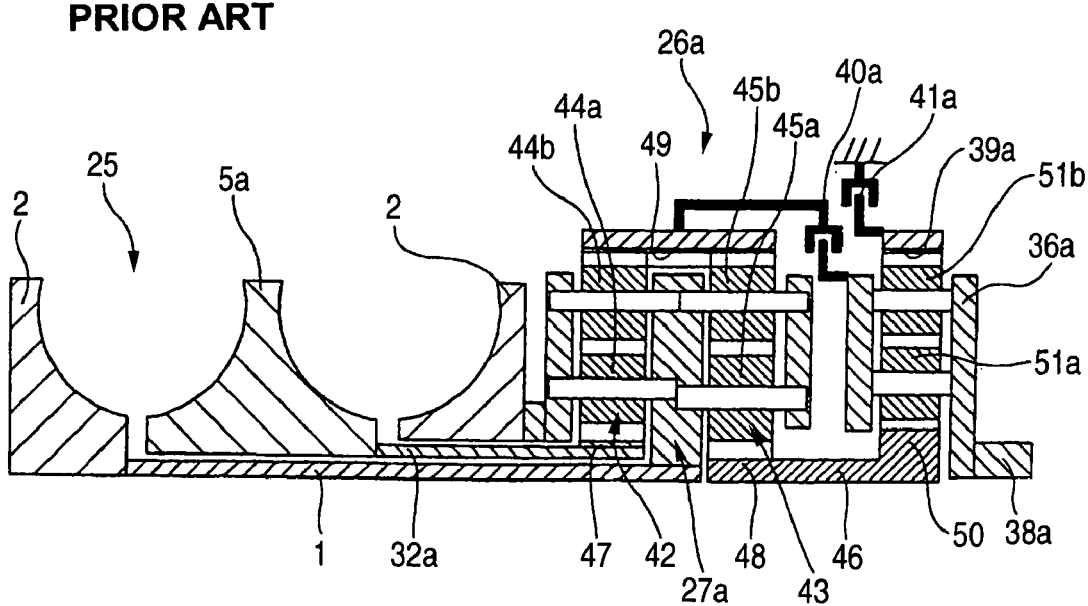
FIG. 10 is an outline sectional view showing an example of a continuously variable transmission apparatus for controlling a transmission ratio by a control apparatus constituted by improving a control apparatus of a prior art.
Figure 11:
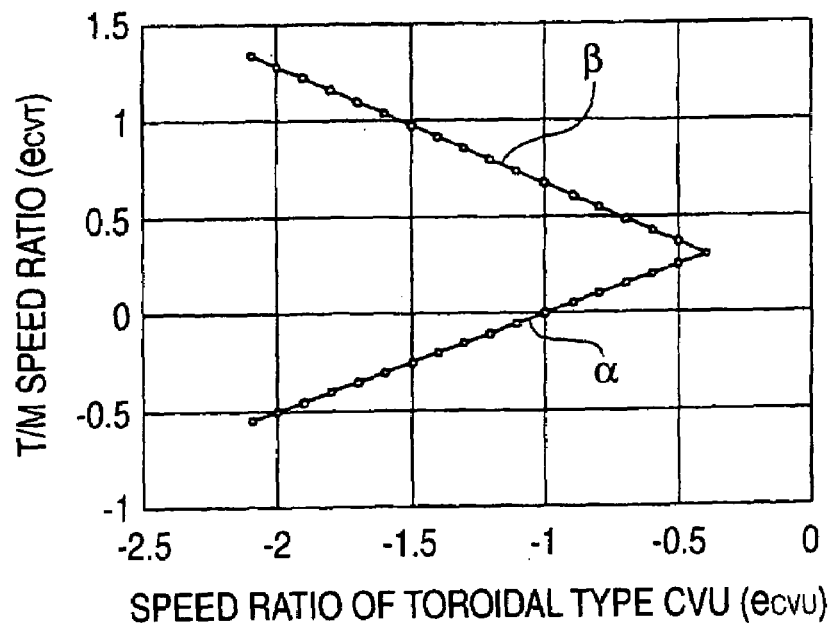
FIG. 11 is a diagram showing a relationship between a speed ratio of a toroidal type continuously variable transmission (CVU) integrated to the continuously variable transmission apparatus and a speed ratio of a total of the continuously variable transmission apparatus (T/M).

First, in the first aspect, the controller 66 calculates the absolute value $N_{OD} \times N_{ID}$ of the rotational speed of the output shaft 38a when the vehicle is not run based on the gear ratio $i_1$ of the planetary gear type transmission 26b and the transmission ratio $N_{OD}/N_{ID}$ of the toroidal type continuously variable transmission 25a and the rotational speed is made to be null. For that purpose, the transmission ratio $N_{OD}/N_{ID}$ of the toroidal type continuously variable transmission 25a is made to be $i_1-1$ ($N_{OD}/N_{ID}=i_1-1$). At this occasion, preferably, the transmission ratio $N_{OD}/N_{ID}$ of the toroidal type continuously variable transmission 25a is controlled to make the rotational speed of the output shaft 38a null in a state of making the target value of the torque transmitted to the output shaft 38a by passing the toroidal type continuously variable transmission 25a null. The control is carried out in a similar manner as shown in FIG. 10 (by setting point a of FIG. 12 on the abscissa).

Further, the control operation is carried out by displacing the trunnions 7 in the axial direction of the pivot shafts 9, 9 by the actuator 10 displaced based on instruction from the controller 66. At this occasion, the control valve apparatus 70 is controlled by a feedback control while calculating the rotational speed $N_{ID}$ of the respective input side disks 2, 2 and the rotational speed $N_{OD}$ of the output side disk 5a based on the detected signals of the two rotation sensors 64, 65. Further, in a state in which the transmission ratio $N_{OD}/N_{ID}$ of the toroidal type continuously variable transmission 25a becomes $i_1-1$, the actuator 10 is stopped. Further, states of respective portions constituting the control valve apparatus 70 under the state are learnt and stored to a memory of the controller 66. Further, when the position switch 76 is switched to the state in which the vehicle is not run (no-running condition), based on the result of leaning stored in the memory, the control valve apparatus 70 is switched. Therefore, regardless of the individual difference of the toroidal type continuously variable transmission 25a, the rotational speed of the output shaft 38a at the instance of switching from the state in which the vehicle is not run (no-running condition) to the running state can be made to be null.

Further, in the second aspect, even when the two clutches 40a, 41a are connected, the torque applied to the output shaft 38a is restricted to be equal to or smaller than the torque to a degree of being applied at the instance of switching from the P range or the N range to the D range or the R range in a general automatic transmission (a torque to a degree by which the vehicle is run at a low speed by creep). Therefore, when the state in which the vehicle is not run (no-running condition) is selected, the transmission ratio $N_{OD}/N_{ID}$ of the toroidal type continuously variable transmission 25a is set to a value other than null (which is clearly larger than a torque based on a friction resistance) as the target value of the torque passing the toroidal type continuously variable transmission 25a in order to add more or less correction based on $i_1-1$ in the above-described case. In the state in which both of the two clutches 40a, 41a are not connected, the torque passing the toroidal type continuously variable transmitter 25a is substantially null (except a torque compatible with a small rotation resistance). Therefore, a deviation is produced between the target value and the actual passing torque.

As a result, in order to resolve the deviation, the controller 66 controls the transmission ratio of the toroidal type continuously variable transmission 25a by switching the pressure difference cylinder 55 constituting the control valve apparatus 70. However, as described above, the range of capable of controlling the transmission ratio of the toroidal type continuously variable transmission 25a by the pressure difference cylinder 55 is within a mechanically limited range and control of the transmission ratio of the toroidal type continuously variable transmission 25a which is carried out for resolving the deviation is small (the deviation is not completely resolved). Meanwhile, in the second aspect, the target value of the transmission ratio of the toroidal type continuously variable transmission 25a (predetermined value) is constituted by a value $(i_1-1+\alpha)$ constituted by adding a correcting value of $\alpha$ to the transmission ratio $i_1-1$ which is needed when the output shaft 38a is completely stopped. The correcting value $\alpha$ is a limit value (correction limit value) capable of controlling the transmission ratio of the toroidal type continuously variable transmission 25a by the pressure difference cylinder 55 and can be positive or negative.

The trunnion 7 is displaced in the axial direction of the pivot shafts 9, 9 by the actuator 10 displaced based on instruction from the controller 66 with the value $(i_1-1+\alpha)$ constituted by adding the correcting value of $\alpha$ to the transmission ratio $i_1-1$ which is needed when the output shaft 38a is completely stopped as the target and in order to control the transmission ratio of the toroidal type continuously variable transmission 25a in the state of setting the target value of the passing torque. Also in this case, the control valve apparatus 70 is controlled by a feedback control while calculating the rotational speed $N_{ID}$ of the respective input side disks 2, 2 and the rotational speed $N_{OD}$ of the output side disk 5a based on the detected signals of the two rotation sensors 64, 65. Further, in a state in which the transmission ratio $N_{OD}/N_{ID}$ of the toroidal type continuously variable transmission 25a becomes $i_1-1+\alpha$, the actuator 10 is stopped.

Further, states of respective portions constituting the control valve apparatus 70 under the states are learnt and stored to the memory of the controller 66. Further, when the position switch 76 is switched to the state in which the vehicle is not run successively, based on the result of learning stored to the memory, the control valve apparatus 70 is switched. Therefore, regardless of the individual difference of the toroidal type continuously variable transmission 25a, the rotational speed of the output shaft 38a at the instance of switching from the state in which the vehicle is not run (no-running condition) to the running state can be made to be a small value. Further, the torque applied to the output shaft 38a under the state can be made to be a small value. In this case, so far as the driver depresses the brake pedal, the automobile can be maintained to be in the stationary state. Therefore, a driving operation similar to that of an automatic transmission which is generally used conventionally is acceptable. Further, large impact is not applied to the respective portions at the instance of selecting the running state.

In the second aspect, regardless of presence of hystereses present at respective frictional engaging portions, the state (learning value) of the control valve apparatus 70 for realizing the predetermined state (a state in which the transmission ratio $N_{OD}/N_{ID}$ of the toroidal type continuously variable transmission 25a becomes $i_1-1+\alpha$) can stably be provided. That is, in the first aspect, there is a possibility that a dispersion is produced in the learning value by hystereses or the like present at frictional engaging portions of the pressure difference piston 55 although an amount thereof is small. In contrast thereto, in the second aspect, the above-described state is realized by a state of depressing the spool 60 constituting the pressure difference piston 55 to one side and therefore, the learning value can stably be calculated without being influenced by the hystereses of the frictional engaging portions.

Further, although not directly related to the invention, in the case of the continuously variable transmission apparatus of the example, functions described below are also added. First, in the case of the continuously variable transmission apparatus of the example, based on the signals from the output shaft rotation sensor 68, the respective input side and output side rotation sensors 64, 65, the position switch 76, and the accelerator sensor 77, when the vehicle is stationary or run at an extremely low speed, the press force produced by the pressing apparatus 23a is made to be smaller than a press force produced in normal running. That is, when it is determined that the shift lever is disposed at the forward moving position (D range or L range) or the rearward moving position (R range) based on the signal from the position switch 76, the vehicle speed is null or at a very low speed (for example, equal to or smaller than 1 km/h), and a driver does not depress the accelerator pedal by the signal from the accelerator sensor 77, the hydraulic pressure introduced into the pressing apparatus 23a is reduced and a creep rate (slip rate) of the traction portion is increased.

Therefore, according to the structure of the example, even when the transmission ratio of the toroidal type continuously variable transmission 25a is more or less varied by external disturbance, a variation in the torque passing the toroidal type continuously variable transmission 25a can be restrained to be small. As a result, when the vehicle is stationary or run at an extremely low speed, even in the case in which the transmission ratio of the toroidal type continuously variable transmission 25a is more or less varied by external disturbance, a variation in a depressing force required for depressing the brake pedal can be restrained to below. Further, it can be prevented that a strange feeling is given to the driver or the driver is exhausted. Further, by restraining the hydraulic pressure supplied to the pressing apparatus 23a to be low, the drive torque of an oil supply pump is reduced, which can contribute to improve fuel cost. In contrast thereto, when the vehicle is normally run, the press force produced by the pressing apparatus 23a becomes sufficiently large, under the state, the creep amount of the traction portion is reduced and a transmitting efficiency at the traction portion can be ensured.

Figure 12:
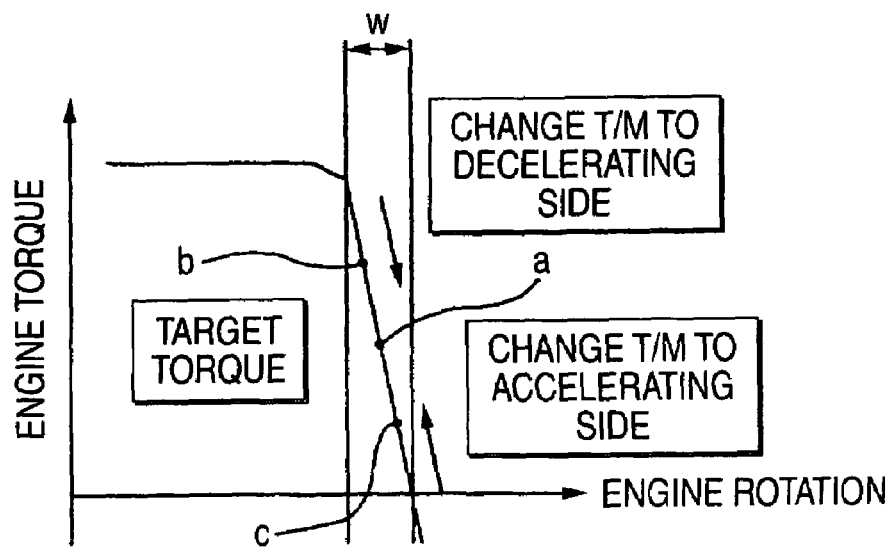
FIG. 12 is a diagram showing a relationship between a rotational speed and a torque of an engine for explaining a state of controlling the transmission ratio by the control apparatus of the continuously variable transmission apparatus shown in FIG. 10.

Second, in the case of the continuously variable transmission apparatus of the example, based on the signals from the output shaft rotation sensor 68, the respective input side and output side rotation sensors 64, 65, the position switch 76, the brake switch 78, the target value (position of point a of FIG. 12 in the ordinate of FIG. 12) of the passing torque of the toroidal type continuously variable transmission 25a is changed. That is, in the case in which the shift lever is switched to forward moving position (D range or L range) or the rearward moving position (R range) based on the signal from the position switch 76 and in the case in which the vehicle speed is null or at an extremely low speed (equal to or smaller than, for example, 1 km/h) and the brake pedal is depressed or the parking brake is brought into an operated state, the target value of the passing torque is lowered (point a of FIG. 12 is shifted to the lower side of the ordinate). As a result, the torque applied to the output shaft 38a is reduced and the vehicle is not started unpreparedly. Further, even when the vehicle is stopped in a state of depressing the brake pedal, the depressing force is reduced and fatigue of the driver can be restrained. Further, resource saving formation is achieved by reducing fuel consumed by the engine 62 by an amount of restraining the output torque of the engine 62.

In contrast thereto, in the case in which the shift lever is disposed at the forward moving position (D range or L range) or the rearward moving position (R range) and in the case in which even when the vehicle speed is null or at an extremely low speed (equal to smaller than, for example, 1 km/h), the brake pedal is not depressed and there is brought about the state in which the parking brake is not operated, the target value of the passing torque is set to be comparatively high. As a result, when the operator operates to start, the vehicle can be started without being jerky. Particularly, in starting on an uphill, even when operation of the accelerator pedal is more or less retarded, the vehicle can be started without being moved rearward. Further, so far as the running speed of the vehicle is not at an extremely low speed (so far as the running speed exceeds, for example, 1 km/h), the vehicle can be run at a low speed by only operating the brake pedal without depressing the accelerator pedal. As a result, the vehicle can easily be put in a garage or longitudinal row parking can easily be carried out. Further, in the case of the example, when the shift lever is disposed in the state in which the vehicle is not run (no-running condition), that is, the parking position (P range) or the neutral position (N range), the drive force is prevented from transmitting to the output shaft 38*a* by disconnecting the clutch apparatus 67 (two low speed and high speed clutches 40*a*, 41*a*). In this case, the engine controller 80 idly rotates the engine 62 by a torque as low as possible and controls the transmission ratio of the toroidal type continuously variable transmission 25*a*.

Next, a simple explanation will be given of the control circuit preferable for controlling the above-described continuously variable transmission apparatus of the invention in reference to FIG. 3. Further, the structure of the portion of controlling the transmission ratio of the toroidal type continuously variable transmission by controlling the stroke of the actuator 10 by the control valve 12, the stepping motor 13, the precess cam 18, the link arm 19 and the pressure difference cylinder 55 is the same as the structure shown in FIG. 14 and therefore, a duplicated explanation thereof will be omitted.

In the hydraulic circuit shown in FIG. 3, the pressurized oil sucked from an oil storage 81 and delivered by oil pumps 69*a*, 69*b* can be controlled to a predetermined pressure by pressure control valves 82*a*, 82*b*. The oil pumps 69*a*, 69*b* correspond to the oil pump described in FIG. 2. Further, in the two pressure control valves 82*a*, 82*b*, the control pressure by the pressure control valve 82*a* for controlling the oil pressure transmitted to the side of the manual oil pressure switch valve 79, mentioned later, is made to be able to be controlled based on opening/closing of the line pressure controlling electromagnetic opening/closing valve 73. Further, the pressurized oil the pressure of which is controlled by the two pressure control valves 82*a*, 82*b* is made to be able to transmit to the actuator 10 via the control valve 12 and made to be able to transmit to the correcting control valve 57 for controlling the stroke of the pressure difference cylinder 55 based on opening/closing of the electromagnetic valves 58*a*, 58*b*.

Further, the pressurized oil is transmitted to the hydraulic pressing apparatus 23*a*. Further, the pressurized oil is made to be able to transmit to the hydraulic chambers of the low speed clutch 40*a* (40) or the high speed clutch 41*a* (41) via the manual hydraulic switch valve 79 and the high speed switch valve 71 or the low speed switch valve 72. Among the respective switch valves 79, 71, 72, the manual hydraulic switch valve 79 is operated by the operating lever (shift lever) provided at the driver's seat and operated by the driver to select the parking range (P), the reverse (rearward) range (R), the neutral range (N), the drive (normal forward) range (D), and the high drive force forward range (L). A state of switching the manual hydraulic switch valve 79 in the case of selecting the respective ranges are as illustrated. Further, display of structures and functions of the respective valves including the manual hydraulic switch valve 79 is by a general method of mechanical drawing with regard to hydraulic apparatus.

Further, respective communicating states of the two high speed and low speed switch valves 71, 72 are respectively switched by charging and discharging the pressurized oil based on switching of the shifting switch valve 83 switched by the shifting electromagnetic valve 74 and therefore, when one switch valve 71 (or 72) feeds the pressurized oil to the hydraulic pressure chamber of the high speed clutch 41*a* (or low speed clutch 40*a*), other switch valve 72 (or 71) discharges the pressurized oil from the hydraulic chamber of the low speed clutch 40*a* (or high speed clutch 41*a*).

A controller having the hydraulic pressure circuit constituted as described above and integrated to the continuously variable transmission apparatus constituted as shown by FIGS. 1 through 2, is provided with the following functions of (1) through (6).

(1) A function of making the rotational state of the output shaft 38*a* convertible to regular rotation and reverse rotation by interposing the stationary state in a state in which the relative displacement speeds of the plurality of gears constituting the planetary gear type transmission 26*b* are changed and the input shaft 1 is rotated in one direction by the engine 62 constituting the drive source by controlling the transmission ratio of the toroidal type continuously variable transmission 25*a* in operation in the low speed mode, that is, in the state of connecting the low speed clutch 40*a* and disconnecting the high speed clutch 41*a*.

Figure 9:
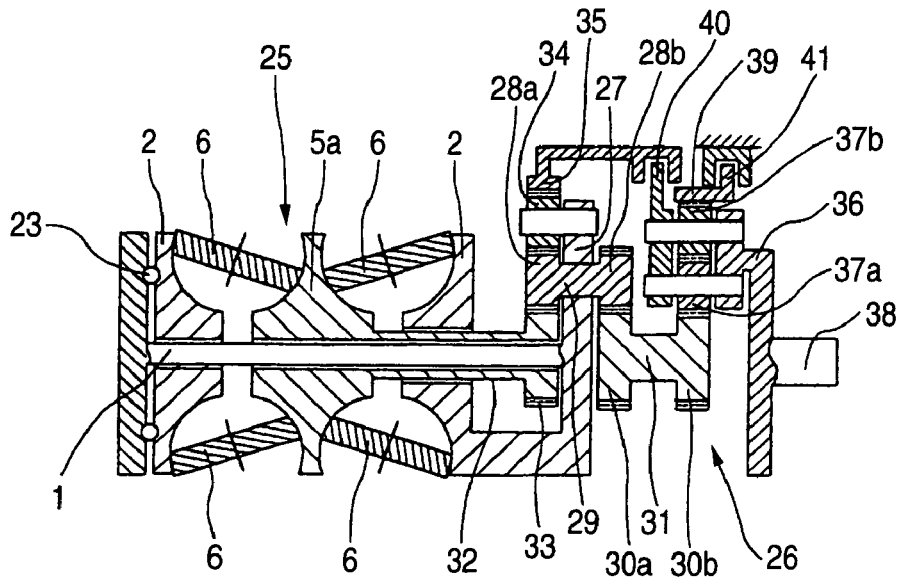
FIG. 9 is an outline sectional view showing an example of a continuously variable transmission apparatus which has conventionally been known.

The function is similar to that of the continuously variable transmission apparatus conventionally known as shown by FIG. 9 or having the structure as shown by FIG. 10.

(2) A function of changing the transmission ratio between the input shaft 1 and the output shaft 38*a* by changing the transmission ratio of the toroidal type continuously variable transmission 25*a* in operation in the high speed mode, that is, in the state of disconnecting the low speed clutch 40*a* and connecting the high speed clutch 41*a*.

Also the function is similar to that of the continuously variable transmission apparatus conventionally known as shown by FIG. 9 or having the structure shown by FIG. 10.

(3) A function of controlling the torque passing the toroidal type continuously variable transmission 25*a* by calculating the rotational speed and the rotational direction of the output shaft 38*a* based on the measured values of the two input side and output side sensors 64, 65 and changing the transmission ratio of the toroidal type continuously variable transmission 25*a* in operation in the low speed mode, that is, in the state of connecting the low speed clutch 40*a* and disconnecting the high speed clutch 41*a*.

(4) A function of disconnecting all of the low speed clutch 40*a* and the high speed clutch 41*a* in the state in which the vehicle is not run (no-running condition), that is, in the state of selecting the parking range or the neutral range by the operating lever.

(5) A function of making the press force produced by the pressing apparatus 23*a* when the vehicle is stationary or run at an extremely low speed smaller than the press force produced in normal running.

(6) A function of making the torque passing the toroidal type continuously variable transmission 25*a* in the case of operating braking means for stopping the vehicle when the vehicle is stationary or is run at an extremely low speed lower than that when the braking means is not operated.

Figure 4:
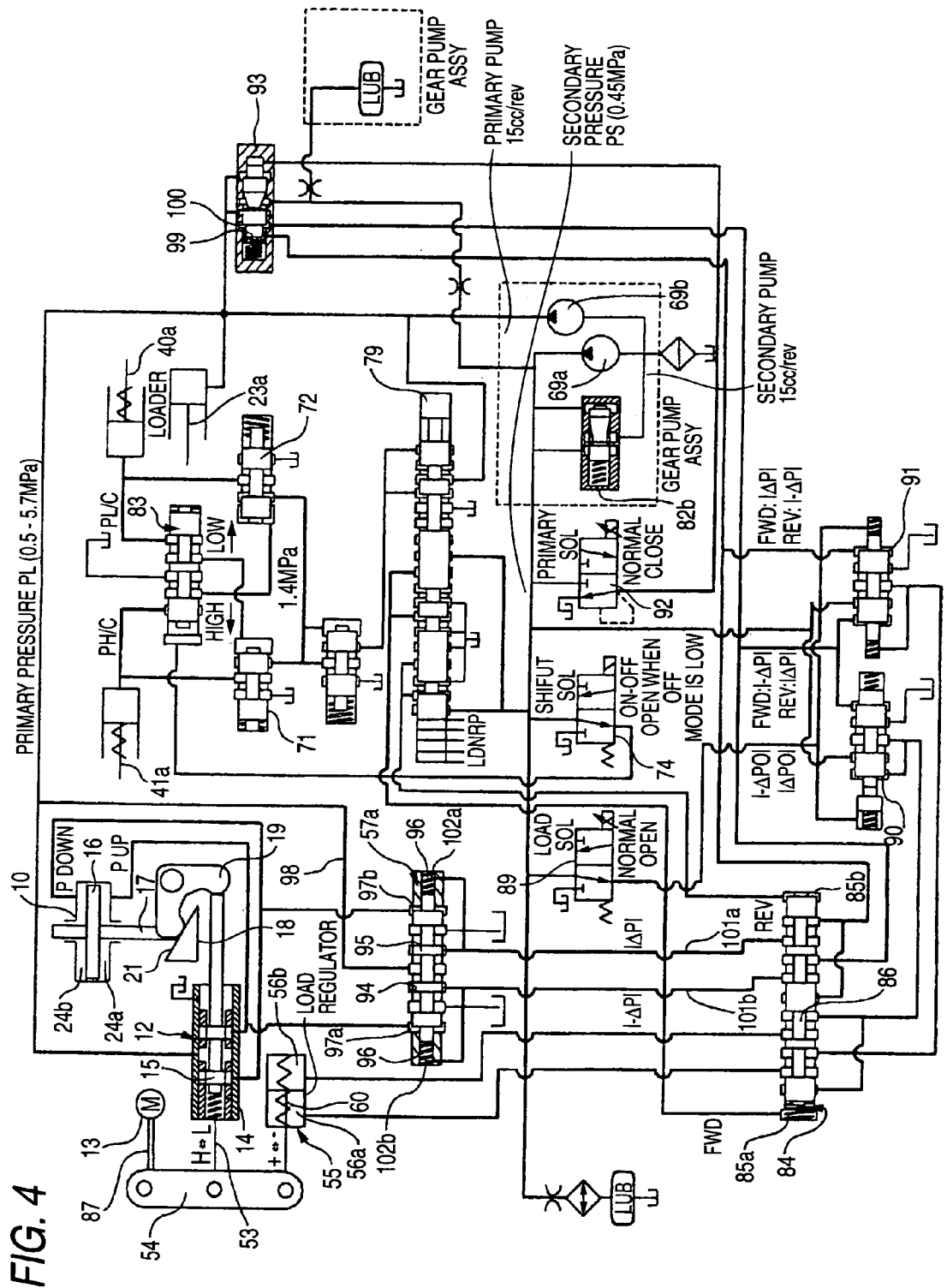
FIG. 4 is a hydraulic circuit diagram constituting a second example of the embodiment of the invention.
Figure 5:
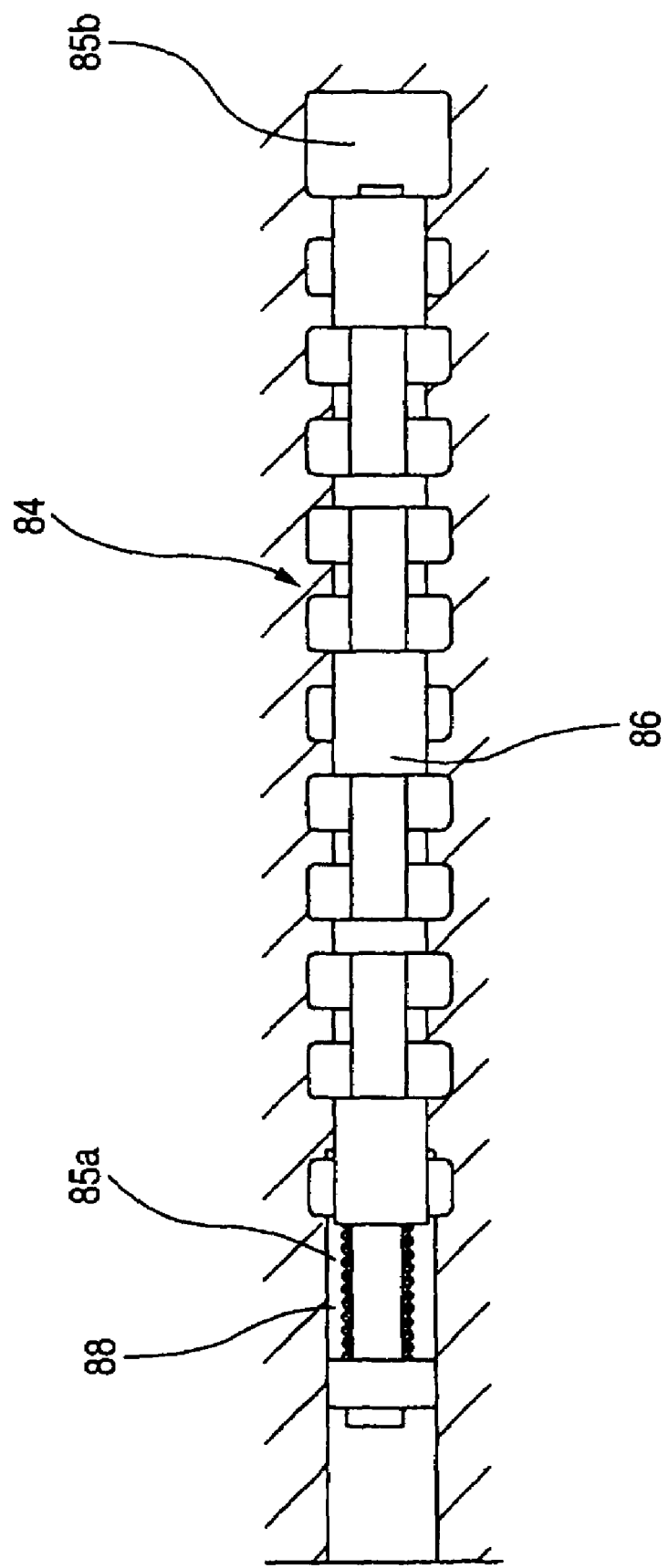
FIG. 5 is a sectional view of a forward/rearward movement switch valve integrated to the hydraulic circuit.

Next, FIGS. 4 through 5 shows a second example of the embodiment of the invention. A main object of the example resides in enabling to control the transmission ratio of the toroidal type continuously variable transmission 25*a* (refer to FIGS. 1 through 2) by uniquely restricting the position of the spool 60 of the pressure difference cylinder 55 in the state of selecting the state in which the vehicle is not run (no-running condition) by the operating lever. First, an explanation will be given of a necessity of such a technology.

Figure 13:
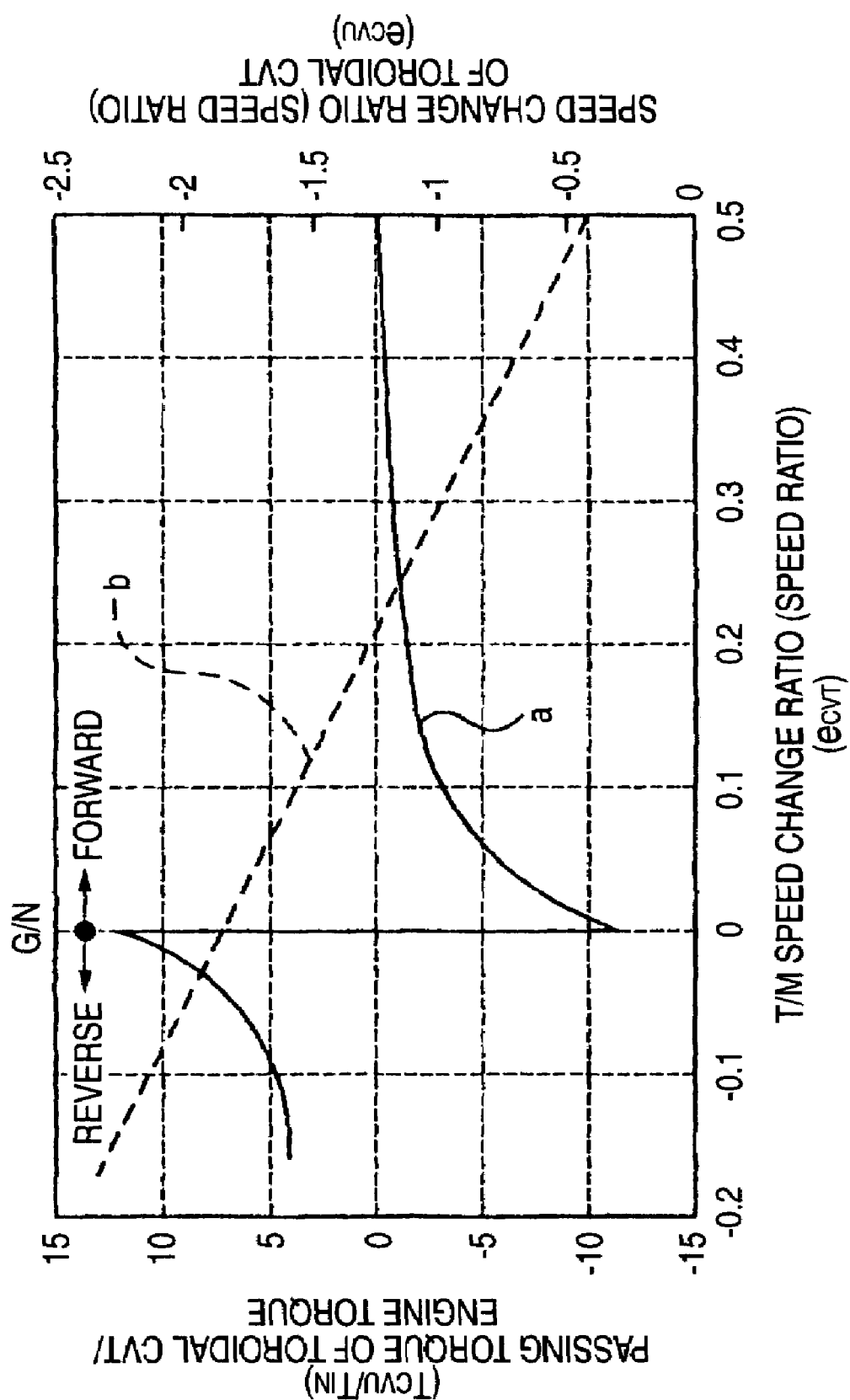
FIG. 13 is a diagram showing a relationship among a torque and a transmission ratio passing the toroidal type continuously variable transmission and a transmission ratio of a total of a continuously variable transmission apparatus.

With regard to the continuously variable transmission apparatus as shown by FIG. 1, in operation in the state of connecting the low speed clutch 40*a* and disconnecting the high speed clutch 41*a*, a logic when the output shaft 38*a* is stationary or rotated at an extremely low speed while rotating the input shaft 1 based on the technology of the structure shown in FIG. 10, differs in moving forward and in moving rearward. The reason is that as is apparent from the bold line a of FIG. 13, the direction of the passing torque of the toroidal type continuously variable transmission 25a is reversed in moving forward and in moving rearward interposing the stationary state. For example, when the torque (actual torque) calculated from the pressure difference between the pair of hydraulic chambers 24a, 24b (refer to FIG. 4) provided at the actuator 10 is larger than the torque (target torque) set as the target, whereas in moving forward, the transmission ratio of the toroidal type continuously variable transmission 25a is corrected to the accelerating side, in moving rearward, the transmission ratio is corrected to decelerating side. Hence, a hydraulic circuit described in FIG. 4 is conceivable as a specific structure used in embodying the technology of the structure shown in FIG. 10. In the hydraulic circuit, a state of introducing the hydraulic pressure into pilot chambers 85a, 85b of a forward/rearward movement switch valve 84 is changed, in accordance with a selection of the manual hydraulic switch valve 79 selected from the forward moving state (D position or L position) and the rearward movement state (R position), by a selection of the operating lever. Further, a direction of displacing a spool 86 of the forward/rearward movement switch valve 84 is reversed between the forward moving state and the rearward moving state to thereby reverse a state of charging and discharging the pressurized oil to and from the hydraulic chamber of the pressure difference cylinder 55. Therefore, even when the difference between the actual torque and the target torque stays the same, directions of displacing the spool 14 of the control valve 12 are reverse from each other between the forward moving state and the rearward moving state.

However, as is apparent from FIG. 4, in the state in which the manual hydraulic switch valve 79 is switched to the parking (P) range or the neutral (N) range by selecting the state in which the vehicle is not run (no-running condition) by the operating lever, hydraulic pressures in pilot chambers 85a; 85b of the hydraulic forward/rearward movement switch valve 84 are null. Under the state, a position in the axial direction of the spool 86 constituting the forward/rearward movement switch valve 84 is not determined and it is not known in which direction the spool 60 of the pressure difference cylinder 55 is moved. Specifically, there is a possibility that the spool 86 of the forward/rearward movement switch valve 84 is moved in an unintended direction by vibration, or an external force of a gravitational force or the like exerted in either direction in accordance with the position of stopping the vehicle and the spool 60 of the pressure difference cylinder 55 is moved in either direction. Further, under the state, it cannot be determined in which direction the spool 60 is moved. Meanwhile, in the case of embodying the invention controlling the rotational speed of the output shaft 38a (refer to FIGS. 1 through 2) by calculating the transmission ratio of the toroidal type continuously variable transmission 25a based on the rotational speed of the input side disks 2, 2 and the rotational speed of the output side disk 5a, it is preferable to take a consideration of the following points.

That is, the sleeve 14 of the controller 12 for changing the transmission ratio of the toroidal type continuously variable transmission 25a is displaced in the axial direction by the spool 60 of the pressure difference cylinder 55 and an output rod 87 of the stepping motor 13. Further, in order to accurately carry out the transmission ratio control of the toroidal type continuously variable transmission 25a, it is preferable that the position in the axial direction of the output rod 87 of the stepping motor 13 is reset in view of the relationship with the transmission ratio of the toroidal type continuously variable transmission 25a at each time of making a power source ON (making an ignition switch ON). Specifically, in the state of making the power source ON, it is preferable to store a position in the axial direction of the output rod 87 (electrical position of the stepping motor 13) capable of making the rotational speed of the output shaft 38a null to the memory of the controller 66 (refer to FIG. 2) of the continuously variable transmission apparatus. In the case of the invention, the object is constituted by the continuously variable transmission apparatus of the geared neutral type and so far as the engine is rotated, the input side disks 2, 2 and the output side disk 5a constituting the toroidal type continuously variable transmission 25a are rotated. Further, based on the rotational speeds of the two disks 2, 5a, the transmission ratio of the toroidal type continuously variable transmission 20a can be calculated. Therefore, so far as the position in the axial direction of the spool 60 of the pressure difference cylinder 55 is known, the position in the axial direction of the output rod 87 of the stepping motor 13 can easily be reset. However, the position in the axial direction of the spool 60 of the pressure difference cylinder 55 is not known by the above-described reason.

Hence, in the case of the example, there is constructed a constitution in which the direction of displacing the spool 60 of the pressure difference cylinder 55 is uniquely restricted in the state in which the vehicle is not run, that is the state in which the manual hydraulic switch valve 79 is switched to the parking (P) range or the neutral (N) range by the operating lever. For that purpose, in the case of the example, the position in the axial direction of the spool 86 constituting the forward/rearward movement switch valve 84 for restricting the state of feeding the pressurized oil into the pair of hydraulic chambers 56a, 56b constituting the pressure difference cylinder 55 is uniquely restricted by a compression coil spring 88 included in the pilot chamber 85a of one (left side one of FIGS. 4 through 5) of the pair of pilot chambers 85a, 85b. Specifically, the spool 86 is pressed to a right end position of FIGS. 4 through 5 by the compression coil spring 88. Further, an elastic force of the compression coil spring 88 is reduced to a degree of capable of lightly pressing the spool 86 to one end in the axial direction (right end of FIGS. 4 through 5). In other words, the compression coil spring 88 is prevented from constituting a substantial resistance against displacement of the spool 86 in the axial direction based on the pressure difference between the pair of pilot chambers 85a, 85b.

Hence, an explanation will be given of structure, operation, and effect of the example while simply explaining the hydraulic circuit shown in FIG. 4. Further, the hydraulic pressure control circuit shown in FIG. 4 is provided with a S function of constituting a torque transmitted to the output shaft 38a (refer to FIGS. 1 through 2) by a degree of capable of running an automobile at a low speed (ensuring a necessary minimum torque) and a function of making an amount and a pressure of a lubricant oil (traction oil) supplied to respective portions proper in an electric failure of a control circuit in addition to the above-described function of uniquely restricting the position in the axial direction of the spool 60 of the pressure difference cylinder 55 in the state in which the vehicle is not run (no-running condition). The function of ensuring the necessary minimum torque thereamong is a function necessary for moving an automobile failed on a road to a safe location of a shoulder or the like.

In the case of the hydraulic control circuit shown in FIG. 4 having the above-described various functions, pressurized oil is charged and discharged to and from the pressure difference cylinder 55 via the outward/rearward movement switch valve 84 by a first and a second pressure difference control valve 90, 91 controlled by a load electric valve 89. The load electromagnetic valve 89 is an electromagnetic proportional valve of a normally open type and is provided with a function of introducing hydraulic pressure substantially in proportional to a voltage applied thereto into the first and the second pressure difference control valves 90, 91 present on a downstream side thereof. Further, pressurized oil is charged and discharged to the low speed clutch 40a and high speed clutch 41a, by the shifting switch valve 83, high speed and low speed switch valves 71, 72 and the shifting electromagnetic valve 74 of a normally open type. Further, a valve opening pressure of a pressurizing pressure control valve 93 is made to be able to control based on open/closing of an electromagnetic valve 92 of a normally closed type. Further, by the manual hydraulic switch valve 79 operated by the shift lever provided at the driver's seat, communicating states of respective portions are made to be able to switch.

Further, a difference of hydraulic pressures of the pair of hydraulic chambers 24a, 24b provided at the actuator 10 for displacing the trunnions 7 (refer to FIGS. 7 through 8) is outputted by a correcting control valve (pressure difference output valve) 57a to introduce into the pressurizing pressure control valve 93. The correcting control valve 57a is provided with respective pairs of springs 96, 96 and pilot portions 97a, 97b interposing a spool 95 fit to inside of the cylinder hole 94 alternately arranged with small diameter portions and large diameter portions displaceably in an axial direction. A plurality of flange portions provided at the spool 99 are fittable to the small diameter portions of the cylinder hole 94 in oil tight. Further pressurized oil controlled by the pressurizing pressure control valve 93 is made to be able to feed into the large diameter portion present at the central portion of the cylinder 94 via a first pressure introducing path 98.

The spool 95 constituting the correcting control valve 57a is displaced in the axial direction in accordance with pressures in the pair of hydraulic chambers 24a, 24b provided to the actuator 10 by interposing the piston 16 which are introduced to the pair of pilot portions 97a, 97b. Further, a state of communicating a downstream end of the first pressure introducing path 98 and a first and a second pilot portion 99, 100 belonging to the pressurizing pressure control valve 93 is controlled via the forward/rearward movement switch valve 84. That is, the spool 95 constituting the correcting control valve 57a is displaced in the axial direction in accordance with the pressure difference between the hydraulic pressures introduced into the pair of pilot portions 97a, 97b. Further, hydraulic pressure is introduced a second pressure introducing path 101a (101b) respective end portions of which are connected to the correcting control valve 57a and reaction force chambers 102a (102b) provided at portions opposed to two end faces of the spool 99 by whether hydraulic pressure introduced to any one of the pilot portions 97a (97b) is higher than hydraulic pressure introduced to other of the pilot portions 97b (97a).

For example, consider a state in which hydraulic pressure of the hydraulic chamber 24a on one side of the actuator 10 is higher than hydraulic pressure of other thereof. In the state, hydraulic pressure introduced to the pilot portion 97a becomes higher than hydraulic pressure introduced to the other pilot portion 97b, the spool 95 is moved to the right side of FIG. 4 and the correcting control valve 57a is switched. As a result, pressurized oil fed through the first pressure introducing port 98 is introduced to the first pilot portion 99 of the pressurizing pressure control valve 93 through the second pressure introducing path 101a on one side (right side of FIG. 4). Further, along therewith, the pressurized oil is introduced to the first and the second pressure difference control valves 90, 91, displaces the pressure difference cylinder 55 via the forward/rearward movement switch valve 84 and displaces the sleeve 14 of the control valve 12 by a small amount.

In contrast thereto, when hydraulic pressure in the hydraulic chamber 24b on other side of the actuator 10 becomes higher than that of the hydraulic chamber 24a on one side, oil pressure introduced into the pilot portion 97b on other side becomes higher than hydraulic pressure introduced into the pilot portion 97a on one side, the spool 95 is moved to the left side of FIG. 4 and the correcting control valve 57a is switched to be reverse to the above-described state. As a result, pressurized oil fed through the first pressure introducing path 98 is introduced to the second pilot portion 100 of the pressurizing pressure control valve 93 through the second pressure introducing path 101b on other side (left side of FIG. 4). Further, along therewith, the pressurized oil is introduced into the first and the second pressure difference control valves 90, 91 and displaces the pressure difference cylinder 55 via the forward/rearward movement switch valve 84.

In any of the cases, pressurized oil introduced into the second pressure introducing paths 101a, 101b is also introduced into the reaction force chamber 102a (102b) of the correcting control valve 57a and presses the end face in the axial direction of the spool 95. Therefore, a force for communicating the first pressure introducing path 98 and the second pressure introducing path 101a (101b) by displacing the spool 95 in the axial direction is proportional to a difference |ΔP| of hydraulic pressures introduced into the pair of pilot portions 97a, 97b provided at the correcting control valve 57a. As a result, hydraulic pressure introduced into the first and the second pilot portions 99, 100 of the pressurizing pressure control valve 93 is proportional to a difference |ΔP| between hydraulic pressures in the hydraulic chambers 24a, 24b of the actuator 10, that is, the power passing the toroidal type continuously variable transmission 25a (refer to FIGS. 1 through 2).

Figure 6:
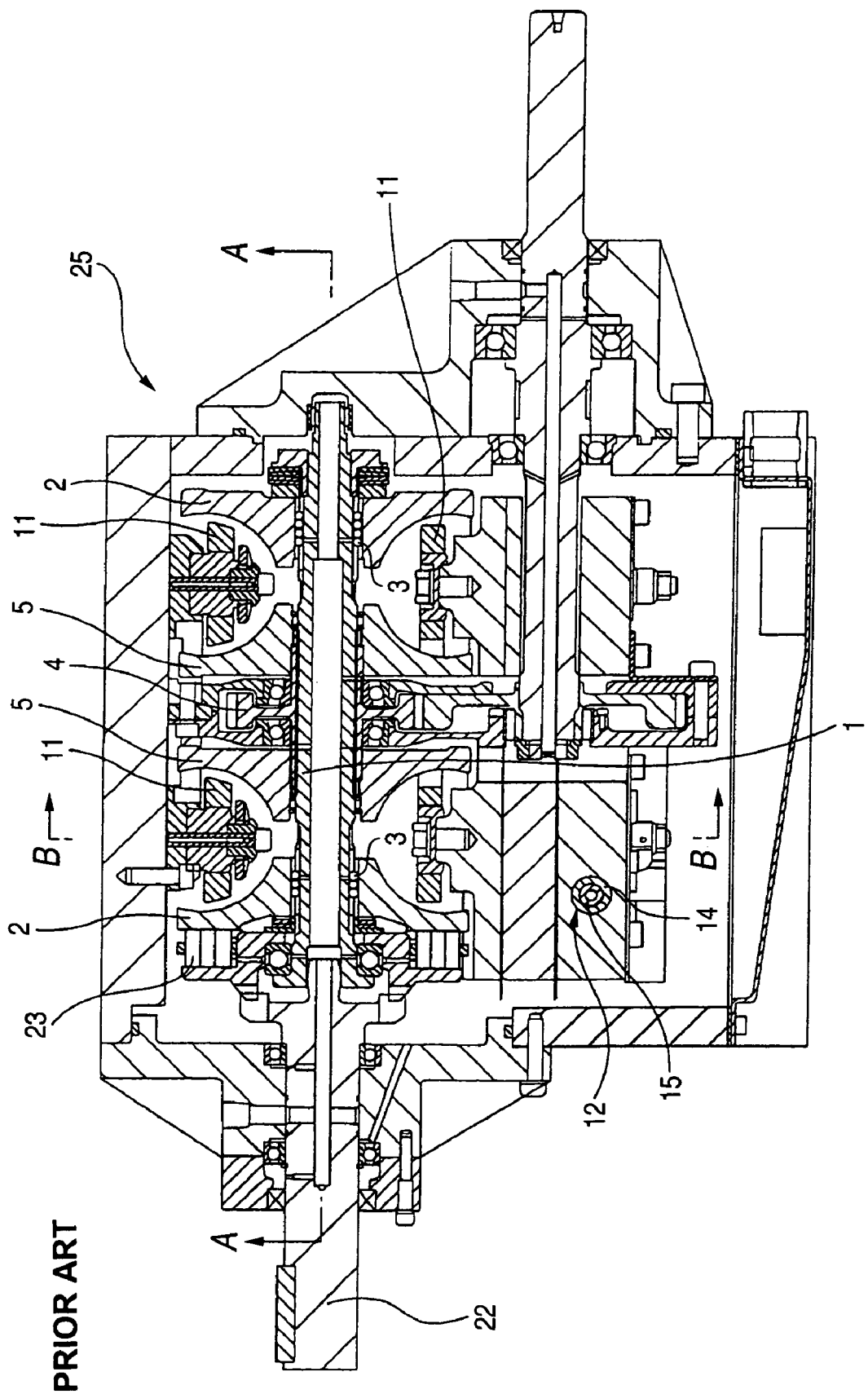
FIG. 6 is a sectional view of an example of a toroidal type continuously variable transmission which has conventionally been known.
Figure 7:
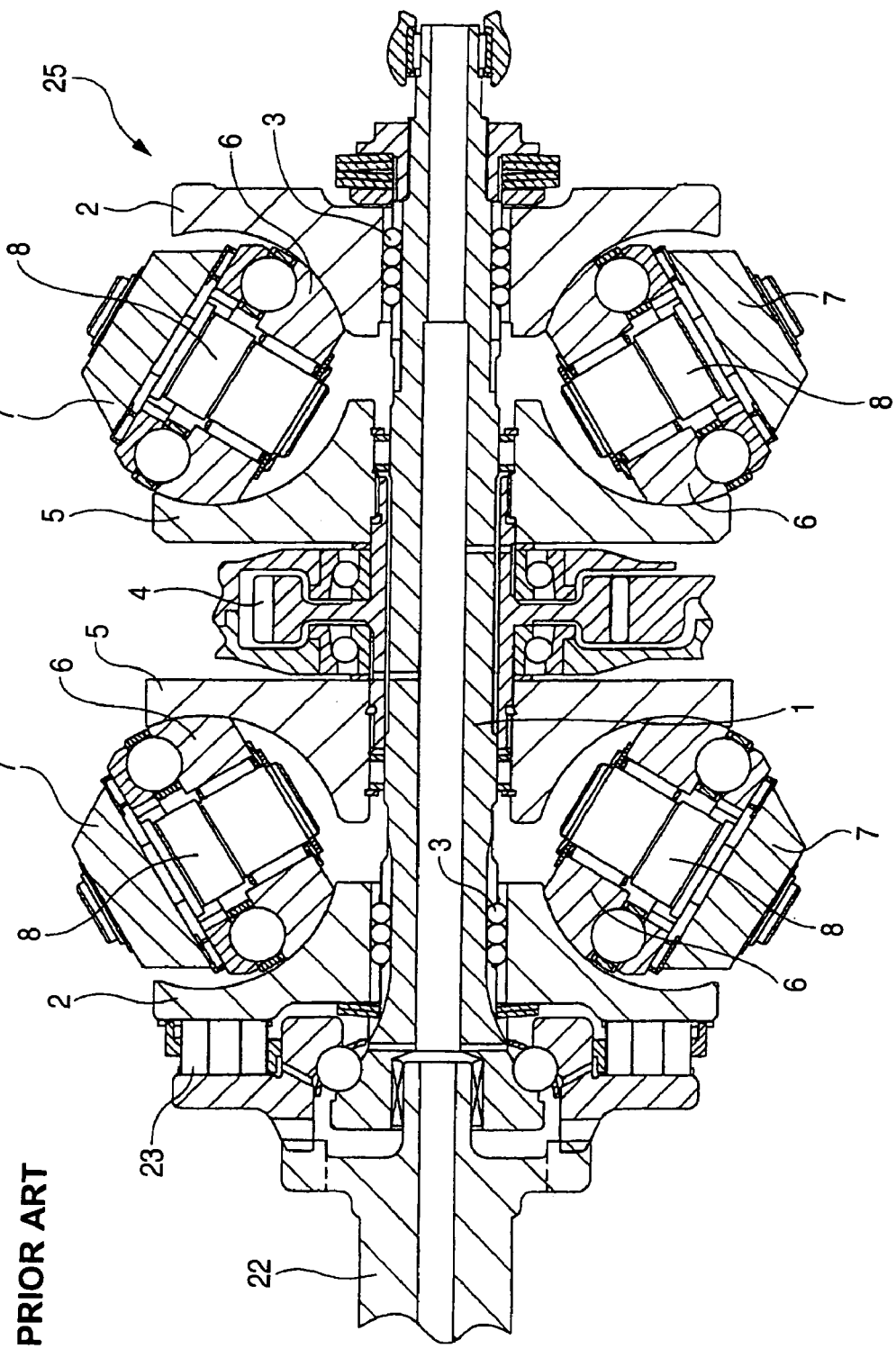
FIG. 7 is a sectional view taken along a line A—A of FIG. 6.

The higher the hydraulic pressure introduced into the first and the second pilot portions 99, 100, the higher the valve opening pressure of the pressurizing pressure control valve 93 and the higher the valve opening pressure of the pressurizing pressure control valve 93, the higher the hydraulic pressure introduced into the hydraulic pressing apparatus 23a provided in place of the mechanical pressing apparatus 23 (refer to FIGS. 6, 7, 9). Therefore, the larger the power passing the toroidal type continuously variable transmission 25a, the larger the hydraulic pressure introduced into the pressing apparatus 23a and therefore, the press force produced by the pressing apparatus 23a. Further, along therewith, an amount of a lubricant oil delivered from the pressurizing pressure control valve 93 is increased and an amount of the lubricant oil fed to respective portions of the toroidal type continuously variable transmission 25a is increased. Therefore, promotion of an efficiency of the total of the continuously variable transmission apparatus can be achieved by preventing power for driving the oil pumps 69a, 69b for delivering the lubricant oil from being consumed wastefully.

Further, in the above-described hydraulic control circuit, fine control of the amount of displacing the spool 15 constituting the control valve 12 by the pressure difference cylinder 55 and therefore, the above-described transmission ratio of the toroidal type continuously variable transmission 25a is carried out by controlling a state of conducting electricity to the load electromagnetic valve 89 of the normally open type. Specifically, a controlling computer (controller 66 of FIG. 2) sets a target value of the torque transmitted to the output shaft 38a in accordance with various vehicle states of the accelerator opening degree, the position of the select lever (position of switching the manual hydraulic switch valve 79), a brake state or the like. Further, the lower the target value, the higher a voltage applied to the load electromagnetic valve 89 is made, and hydraulic pressure introduced to the first and the second pressure difference control valves 90, 91 is lowered by reducing the opening degree of the load electromagnetic valve 89 (reducing moment of opening). As a result, hydraulic pressure introduced into the pressure difference cylinder 55 via the first and the second pressure difference control valves 90, 91 is lowered and an amount of correcting the transmission ratio of the toroidal type continuously variable transmission 25a by the pressure difference cylinder 55 is reduced. Under the state, so far as the spool 15 of the control valve 12 is not displaced by the stepping motor 13, the torque transmitted to the output shaft 38a is reduced (to a degree which is insufficient in running the automobile).

Conversely, the higher the target value, the lower the voltage applied to the load electromagnetic valve 89 is made, and the hydraulic pressure introduced into the first and the second pressure difference control valves 90, 91 is made to be high (for example, 0.45 MPa which is the line pressure) by increasing the opening degree of the load electromagnetic valve 89 (by increasing the instance of opening). As a result, hydraulic pressure introduced into the pressure difference cylinder 55 via the first and the second pressure difference control valves 90, 91 is increased and the amount of correcting the transmission ratio of the toroidal type continuously variable transmission 25a by the pressure difference cylinder 55 is increased. Under the state, even when the spool 15 of the control valve 12 is not displaced by the stepping motor 13, the torque transmitted to the output shaft 38a is increased to a degree which is sufficient for running the automobile at a low speed so far as the brake pedal is not depressed or the parting brake is not operated.

According to the hydraulic control circuit having the above-described constitution and operated as described above, a position in the axial direction of the spool 60 of the pressure difference cylinder 55 in a state in which the vehicle is not run (no-running condition) and in the state in which the ignition switch is made ON is uniquely restricted as follows. First, under the sate, hydraulic pressure is not present in the pair of pilot chambers 85a, 85b provided at the forward/rearward movement switch valve 84. Therefore, a position in the axial direction of the spool 86 constituting the forward/rearward movement switch valve 84 is restricted uniquely (to the right end position of FIGS. 4 through 5) by the compression coil spring 88. Further, under the state (the state in which the ignition switch is made ON and the vehicle is not run), the controller 66 of the continuously variable transmission apparatus outputs a signal representing a large value which cannot be present actually as a difference between the actual torque and the target torque (which is set for resetting operation). As a result, the position in the axial direction of the spool 60 of the pressure difference cylinder 55 is moved to either one of end portions thereof. Under the state, the positions in the axial directions of the spools 86, 60 of the forward/rearward movement switch valve 84 and the pressure difference cylinder 55 become known positions which are previously set.

Hence, under the state, the position in the axial direction of the output rod 87 of the stepping motor 13 is reset in view of the relationship with the transmission ratio of the toroidal type continuously variable transmission 25a. Further, in the actual case, the position in the axial direction of the output rod 87 of the stepping motor 13 is reset such that the rotational speed of the output shaft 38a can be made to be null under the state in which the position in the axial direction of the spool 60 of the pressure difference cylinder 55 is disposed at a neutral position. Therefore, the position in the axial direction of the output rod 87 of the stepping motor 13 is reset by electrically correcting an amount of a shift at the position in the axial direction of the spool 60 of the pressure difference cylinder 55 (a distance from the neutral position to the end portion). Such a correction is easily carried out by a software installed to a microcomputer constituting the controller 66.

Further, although in order to enable the resetting operation, in the above-described example, the spool 86 constituting the forward/rearward movement switch valve 84 is pressed by the compression coil spring 88, the position in the axial direction of the spool 86 can also uniquely be restricted by other structure. For example, the forward/rearward movement switch valve 84 is provided with a third pilot chamber for introducing hydraulic pressure only when the vehicle is not run at one end portion in the axial direction, in the state in which the vehicle is not run (no-running condition), the spool 86 is displaced to other end side in the axial direction by hydraulic pressure introduced into the third hydraulic chamber to thereby uniquely restrain the position in the axial direction of the spool 86.

Further, operation of starting the engine by making the ignition switch ON is made to carry out only when the operating lever is brought into the state in which the vehicle is not run (parking range or neutral range) similar to an automobile mounted with an automatic transmission which has been generally embodied conventionally. In this way, when the engine is started by making the ignition switch ON in the state in which the vehicle is not run (no-running condition), at each time of starting the engine, the position in the axial direction of the output rod 87 of the stepping motor 13 is reset in view of the relationship with the transmission ratio of the toroidal type continuously variable transmission 25a.

Further, in the case of the illustrated example, the load electrode magnetic valve 89 of the normally open type is used and therefore, when electricity conduction to the load electromagnetic valve 89 is cut (applied voltage become null) by a failure in the electronic control circuit, hydraulic pressure introduced into the pressure difference cylinder 55 becomes a maximum value and an amount of correcting the transmission ratio of the toroidal type continuously variable transmission 25a by the pressure difference cylinder 55 becomes a maximum value. As a result, in failure of the electric control circuit, the torque transmitted to the output shaft 38a can be increased to a degree of capable of running the automobile at a low speed. Further, the automobile failed on the road can be moved to a safe location of a shoulder or the like. In other words, in failure of the electric control circuit, when the manual hydraulic switch valve 79 is switched to the running state (D or L range or R range), the torque to the degree of capable of running the automobile at a low speed is applied to the output shaft 38a. Further, in such a case, it is preferable to inform occurrence of the failure to the driver by an alarm light or an alarm buzzer or the like installed on a dashboard or the like in front of the driver's seat and issue an alarm for preventing the driver from driving the vehicle more than necessary minimum for escapement.

The invention is constituted and operated as described above and therefore, at the instant of switching from the state in which the vehicle is not run to the running state, an excessively large torque can be prevented from being applied to the output shaft, which can contribute to realize the continuously variable transmission apparatus capable of providing the infinity transmission ratio.

What is claimed is:

1. A continuously variable transmission apparatus comprising:
    an input shaft;
    an output shaft;
    a toroidal continuously variable transmission; a differential unit comprising a plurality of gears; and
    a controller for changing a transmission ratio of the toroidal continuously variable transmission,
    wherein the toroidal continuously variable transmission comprises:
        an input side disk rotated by the input shaft;
        an output side disk concentrically supported with the input side disk and rotatable relative to the input side disk;
        a plurality of power rollers interposed between the input side disk and the output side disk;
        a plurality of support members rotatably supporting the respective power rollers respectively; and
        an actuator, for changing the transmission ratio between the input side disk and the output side disk, by displacing the respective support members, and
    the differential unit comprises
        a first input portion rotated with the input side disk by a rotation of the input shaft; and
        a second input portion connected to the output side disk, wherein the differential unit transmits a rotation to the output shaft in accordance with a speed difference between the first and the second input portions, and
    further comprising:
    an input side rotation sensor for detecting a rotational speed of the input side disk; and
    an output side rotation sensor for detecting a rotational speed of the output side disk,
    wherein the controller controls the transmission ratio of the troidal continuously variable transmission so as to change relative displacement speeds of the plurality of gears, thereby a rotational state of the output shaft is converted to regular rotation and reverse rotation, interposing a stationary state, while the input shaft is brought into a state of being rotated in one direction,
    the controller calculates a rotational speed of the output shaft, based on the rotational speed of the input side disk detected by the input side rotation sensor, the rotational speed of the output side disk detected by the output side rotational sensor, and a gear ratio of the differential unit, and
    if a no-running condition in which rotation of the input shaft is not transmitted to the output shaft is selected, the controller controls the transmission ratio of the toroidal continuously variable transmission, so that the rotation speed of the output shaft becomes null.

2. The continuously variable transmission apparatus according to claim 1, wherein the controller controls a torque transmitted through the toroidal continuously variable transmission by changing the transmission ratio of the toroidal continuously variable transmission.

3. The continuously variable transmission apparatus according to claim 2, wherein the controller controls the transmission ratio of the toroidal continuously variable transmission in order to nullify the rotational speed of the output shaft, if a target value of the torque transmitted through the toroidal continuously variable transmission is set to null.

4. The continuously variable transmission apparatus according to claim 1, wherein a signal for displacing the actuator in a state of nullifying the rotational speed of the output shaft is learnt and stored as a signal for stopping the output shaft while rotating the input shaft.

5. A continuously variable transmission apparatus comprising:
    an input shaft;
    an output shaft;
    a toroidal continuously variable transmission;
    a differential gear unit constituted by combining a plurality of gears; and
    a controller for changing a transmission ratio of the toroidal continuously variable transmission,
    wherein the toroidal continuously variable transmission comprises;
        an input side disk driven to rotate by the input shaft;
        an output side disk concentrically supported with the input side disk and rotatable relative to the input side disk;
        a plurality of power rollers interposed between the input side disk and the output side disk;
        a plurality of support members rotatably supporting the respective power rollers; and
        an actuator, for changing the transmission ratio between the input side disk and the output side disk, by displacing the respective support members, and
    the differential unit comprises:
    a first input portion rotated with the input side disk by a rotation of the input shaft; and
    a second input portion connected to the output side disk, wherein the differential unit transmites rotation to the output shaft in accordance with a speed difference between the first and the second input portions, and
    further comprising:
    an input side rotation sensor for detecting a rotational speed of the input side disk; and
    an output side rotation sensor for detecting a rotational speed of the output side disk,
    wherein the controller converts a rotational state of the output shaft to regular rotation and reverse rotation by interposing a stationary state while the input shaft is brought into a state of being rotated in one direction, by changing relative displacement speeds of the plurality of gears constituting the differential unit by controlling the transmission ratio of the toroidal continuously variable transmission,
    the controller controls a toque transmitted through the toroidal continuously variable transmission by changing the transmission ratio of the toroidal continuously variable transmission within a mechanically limited range, and
    if a no-running condition in which rotation of the input shaft is not transmitted to the output shaft is selected, the controller controls the transmission ratio of the toroidal continuously variable transmission, so that the torque transmitted through the toroidal continuously variable transmission is set to a value other than null, and that a speed ratio between the input side disk and the output side disk calculated by detected signals of the input side and the output side of rotation detecting sensors becomes a predetermined value.

6. The continuously variable transmission apparatus according to claim 5, wherein the controller learns and stores a signal, for displacing the actuator in a state in which the transmission ratio of the toroidal continuously variable transmission is controlled such that the speed ratio between the input side disk and the output side disk becomes the predetermined value, as a signal for enabling to stop the output shaft while the input shaft is made to stay to be rotated.

7. The continuously variable transmission apparatus according to claim 1, further comprising a select lever at a driver's seat,
   wherein, if the select lever is positioned at a parking range or a neutral range, the selection of the no-running condition is detected.

8. The continuously variable transmission apparatus according to claim 5, further comprising a select lever at a driver's seat,
   wherein, if the select lever is positioned at a parking range or a neutral range, the selection of the no-running condition is detected.

9. The continuously variable transmission apparatus according to claim 1, further comprising:
   a control valve, for changing the transmission ratio of the toroidal continuously variable transmission, including a constituent member operated by an output rod of a motor and a spool of a pressure difference cylinder,
   wherein a displacing direction of the constituent member, when the no-running condition is selected, is uniquely restricted.

10. The continuously variable transmission apparatus according to claim 5, further comprising:
    a control valve, for changing the transmission ratio of the toroidal continuously variable transmission, including a constituent member operated by an output rod of a motor and a spool of a pressure difference cylinder,
    wherein a displacing direction of the constituent member, when the no-running condition is selected, is uniquely restricted.

11. The continuously variable transmission apparatus according to claim 9, wherein a feeding of a pressurized oil to a pair of pressure chambers constituting the pressure difference cylinder is restricted based on a displacement in an axial direction of the spool constituting a forward/rearward switch valve,
    and a position in an axial direction of the spool is uniquely restricted by a spring included in the forward/rearward switch valve in a state in which a hydraulic pressure is not introduced into the forward/rearward switch valve.

12. The continuously variable transmission apparatus according to claim 10, wherein a feeding of a pressurized oil to a pair of pressure chambers constituting the pressure difference cylinder is restricted based on a displacement in an axial direction of the spool constituting a forward/rearward switch valve, and
    a position in an axial direction of the spool is uniquely restricted by a spring included in the forward/rearward switch valve in a state in which a hydraulic pressure is not introduced into the forward/rearward switch valve.

* * * * *